US007600221B1

(12) United States Patent
Rangachari

(10) Patent No.: US 7,600,221 B1
(45) Date of Patent: Oct. 6, 2009

(54) METHODS AND APPARATUS OF AN ARCHITECTURE SUPPORTING EXECUTION OF INSTRUCTIONS IN PARALLEL

(75) Inventor: Achutha Raman Rangachari, Chennai (IN)

(73) Assignee: Sun Microsystems, Inc., Santa Clara, CA (US)

( * ) Notice: Subject to any disclaimer, the term of this patent is extended or adjusted under 35 U.S.C. 154(b) by 1224 days.

(21) Appl. No.: 10/679,939

(22) Filed: Oct. 6, 2003

(51) Int. Cl.
- G06F 9/44 (2006.01)
- G06F 9/40 (2006.01)
- G06F 7/38 (2006.01)

(52) U.S. Cl. .................. 717/128; 717/131; 712/215; 712/226

(58) Field of Classification Search .............. 717/128, 717/131
See application file for complete search history.

(56) References Cited

U.S. PATENT DOCUMENTS

| | | | |
|---|---|---|---|
| 5,991,790 A | 11/1999 | Shah et al. | 709/100 |
| 6,205,465 B1 | 3/2001 | Schoening et al. | 709/102 |
| 6,230,313 B1 * | 5/2001 | Callahan et al. | 717/128 |
| 6,233,725 B1 | 5/2001 | Beadle et al. | 717/1 |
| 6,266,811 B1 | 7/2001 | Nabahi | 717/11 |
| 6,345,351 B1 | 2/2002 | Holmberg | 711/203 |
| 6,374,238 B1 | 4/2002 | Iwata et al. | 707/3 |
| 6,505,228 B1 | 1/2003 | Schoening et al. | 709/106 |
| 6,598,012 B1 | 7/2003 | Berry et al. | 702/187 |
| 6,658,655 B1 | 12/2003 | Hoogerbrugge et al. | 717/139 |
| 6,665,708 B1 | 12/2003 | Tikekar et al. | 709/215 |
| 6,697,835 B1 | 2/2004 | Hanson et al. | 709/201 |
| 6,718,457 B2 | 4/2004 | Tremblay et al. | 712/212 |
| 6,732,084 B1 | 5/2004 | Kabra et al. | 707/2 |
| 6,738,967 B1 | 5/2004 | Radigan | 717/146 |
| 6,817,013 B2 * | 11/2004 | Tabata et al. | 717/151 |
| 7,210,127 B1 | 4/2007 | Rangachari | |
| 2003/0126408 A1 * | 7/2003 | Vajapeyam et al. | 712/214 |

OTHER PUBLICATIONS

R. Radhakrishnan, et al., "Allowing for ILP in an Embedded Java Processor", Laboratory for Computer Architecture, Electrical and Computer Engineering Department, The University of Texas at Austin, pp. 294-305, Jun. 2000, International Symposium on Computer Arcitecture.
I. Kazi, et al., "Techniques for Obtaining High Performance in Java Programs", Laboratory for Advanced Research in Computing Technology and Compilers, Department of Electrical and Computer Engineering, University of Minnesota, pp. 1-44, Sep. 2000.
D. Harty, et al., "picoJava II microArchitecture", Sun Microsystems, Inc, 1997.

(Continued)

*Primary Examiner*—Tuan Q Dam
*Assistant Examiner*—Isaac T Tecklu
(74) *Attorney, Agent, or Firm*—Brooks Hushman, P.C.

(57) ABSTRACT

A processing architecture supports executing instructions in parallel after identifying at least one level of dependency associated with a set of traces within a segment of code. Each trace represents a sequence of logical instructions within the segment of code that can be executed in a corresponding operand stack. Scheduling information is generated based on a dependency order identified among the set of traces. Thus, multiple traces may be scheduled for parallel execution unless a dependency order indicates that a second trace is dependent upon a first trace. In this instance, the first trace is executed prior to the second trace. Trace dependencies may be identified at run-time as well as prior to execution of traces in parallel. Results associated with execution of a trace are stored in a temporary buffer (instead of memory) until after it is known that a data dependency was not detected at run-time.

35 Claims, 15 Drawing Sheets

OTHER PUBLICATIONS

R. Helaihel, et al., "JMTP: An Architecture for Exploiting Concurrency in Embedded Java Applications with Real-time Considerations", Computer Systems Laboratory, Stanford University, Nov. 1999.

M. El-Kharashi, et al., "An Operand Extraction-Based Stack Folding Algorithm for Java Processors" Department of Electrical and Computer Engineering, University of Victoria, pp. 1-5, Sep. 2000.

K. Scott, et al., "BLP: Applying ILP Techniques to Bytecode Execution", Department of Computer Science, University of Virginia, pp. 1-8, Sep. 2000.

C. Chang, et al., "Stack Operations folding in Java Processors", Department of Computer Science and Information Engineering, National Chiao Tung University, Republic of China, pp. 330-340, Proc.-Comput. Digit. Tech. vol. 145, No. 5, Sep. 1998.

K. Watanabe, et al., "Exploiting Java Instruciton/Thread Level Parallelism with Horizontal Multithreading", Department of Computer Hardware, University of Aizu, Japan and Department of Computer Science, Hosei University, Japan, Jan. 2001.

* cited by examiner

METHODS AND APPARATUS OF AN ARCHITECTURE SUPPORTING EXECUTION OF INSTRUCTIONS IN PARALLEL

FIELD OF THE INVENTION

One embodiment of the present invention generally relates to computer systems that execute software instructions in parallel.

BACKGROUND OF THE INVENTION

Software developers typically create conventional software applications by writing software "source code" in a high-level programming language such as C, C++, Java or the like. The software developer utilizes a program called a compiler to convert the high-level programming language source code into a machine understandable or machine-readable form called "object code" that the complier creates for execution on a specific target processor architecture. A processor within a computerized device that confirms to the target architecture can "execute" the object code in order to operate the program. As an example, a software developer who creates a software application in the C programming language can use a C compiler designed for a specific processor architecture to convert the C programming language statements (i.e., source code instructions) in the application into machine language instructions that can natively execute as a program on that processor within a computerized device.

Some programming languages are designed to allow a software developer to write application code once and thereafter operate this code on any computerized device that supports that programming language, regardless of the processor or architecture of the computerized device. As an example, a program written in the Java programming language (Java is a registered trademark of Sun Microsystems, Inc. of Palo Alto, Calif., U.S.A.) can operate on any computerized device platform that has or that implements a Java run-time environment known as a Java Virtual Machine (JVM). To run a Java program, a developer first compiles the Java program using a Java compiler (e.g., javac) that produces intermediate instructions called "bytecode". A user who desires to operate the Java program can transfer the bytecode instructions for that program to any computerized device that runs under the control of any operating system, as long as a "Java Virtual Machine" or JVM exists that can operate in conjunction with that operating system or computerized device to interpret the Java bytecodes. In other words, to accommodate a diversity of operating environments, a Java compiler doesn't generate "machine code" in the sense of native hardware instructions that execute directly in a microprocessor; but rather, the Java compiler generates bytecodes that are a high-level, machine-independent code for a hypothetical machine that is implemented by the Java interpreter and run-time system known as a Java Virtual Machine. The primary benefit of the interpreted bytecode approach is that compiled Java language programs are portable to any system on which a Java Virtual Machine exists.

There has been an ongoing trend in the information technology industry to execute software programs more quickly. There are various conventional advancements that provide for increased execution speed of software programs. One technique for increasing execution speed of a program is called parallelism. Parallelism is the practice of executing or performing multiple things simultaneously. Parallelism can be possible on multiple levels, from executing multiple instructions at the same time, to executing multiple threads at the same time, to executing multiple programs at the same time. Instruction Level Parallelism or ILP is parallelism at the lowest level and involves executing multiple instructions simultaneously. Processors that exploit ILP are typically called multiple-issue processors, meaning they can issue multiple instructions in a single clock cycle to the various functional units on the processor chip.

There are different types of conventional multiple-issue processors. One multiple-issue processor is a superscalar processor in which a sequential list of program instructions are dynamically scheduled, and the processor decides which instructions can be executed on the same clock cycle, and sends them out to their respective functional units to be executed. This type of multi-issue processor is called an in-order-issue processor since issuance of instructions is performed in the same sequential order as the program sequence, but issued instructions may complete at different times (e.g., short instructions requiring fewer cycles may complete before longer ones requiring more cycles). Another type of multi-issue processor is called a VLIW (Very Large Instruction Width) processor. A VLIW processor depends on a compiler to do all the work of instruction reordering and the processor executes the instructions that the compiler provides as fast as possible according to the compiler-determined order. Other types of multi-issue processors issue out of order instructions, meaning the instruction issue order is not be the same order as the order of instructions as they appear in the program.

Conventional techniques for executing instructions using ILP often utilized look-ahead techniques to find a larger amount of instructions that can execute in parallel within an instruction window. Looking-ahead often involves determining which instructions might depend upon others during execution for such things as shared variables, shared memory, interference conditions, and the like. When scheduling, a handler associated with the processor detects a group of instructions that do not interfere or depend on each other. The processor can then issue execution of these instructions in parallel thus conserving processor cycles and resulting in faster execution of the program.

Conventional computer systems that execute programs written in a programming language such as Java operate a Java Virtual Machine during run-time to interpret or otherwise convert the Java bytecode instructions into native machine language instructions. As an example, to execute a series of Java bytecode instructions, a Java virtual machine can operate a program called a Just-In-Time (JIT) compiler. A JIT compiler is a software layer that compiles or interprets bytecode instructions just before they are executed thus converting the Java bytecode into native machine language code for the processor to natively execute at that moment. Typically, general purpose computerized devices use either interpretation or Just-In-Time (JIT) compilation to convert the Java bytecodes to native instructions that are then run on conventional processors.

Java developers have also created conventional processors that execute Java bytecode directly. Such Java bytecode processors or "Java processors" are becoming popular as software application developers create an increasingly large number of complex server and other software applications in Java. Due to the nature of many of these applications, it is important to achieve very high performance during execution. The designs of such bytecode processors are mainly based on stack architectures.

One conventional technique that has been used to enhance some JVM implementations in hardware is called "instruction folding", in which a processor "folds" a set of bytecodes into one instruction. Instruction folding increases the performance of bytecode execution by coalescing a bytecode, for example, which just spends processor cycle time moving data from a stack to the operational units, into another bytecode instruction that does the actual operation on the moved data, rather than executing each bytecode instruction separately.

Existing conventional Java virtual machine and Java processors utilize a stack-based architecture for execution of Java bytecode. That is, a conventional Java virtual machine and/or a Java processor do not use registers to hold intermediate data values, but rather uses the Java operand stack for storage of all intermediate data values. This approach was taken by Java's designers to keep the Java virtual machine's instruction set compact and to facilitate implementation on architectures with few or irregular general-purpose registers.

During execution of a program containing Java bytecode instructions, the Java virtual machine can recognize different execution threads or paths through the program. During execution of a Java thread, the Java virtual machine provides a Java stack to store the state of execution of bytecode instructions that are interpreted or JIT compiled in that thread. The state of execution can include local variables, bytecode parameters called "operands", and results of individual bytecode instructions "opcodes" that each correspond to the different processing functions of each bytecode instruction in the Java bytecode instruction set. There is no way for a thread to access or alter the Java stack of another thread. During the execution of each Java bytecode instruction, the Java virtual machine may push and/or pop values onto and off of the stack, thus using the stack as a workspace. Many instructions pop values from the operand stack, operate on them, and push the resultant contents back onto the stack. For example, an "iadd" bytecode instruction adds two integers by popping two integer values off the top of the operand stack, adding them together and pushing the integer result back onto the stack associated with that thread.

SUMMARY

Conventional technologies that provide high-performance execution of software applications such as Java programs suffer from a variety of deficiencies related to performance. In particular, a conventional software application written in a programming language (such as Java) executes bytecode. Since the conventional Java virtual machine interprets bytecodes into machine language or uses a JIT compiler to provide just-in-time compilation of the bytecode instructions, the instruction window available for ILP performance enhancement (i.e., parallel execution of instructions) is significantly limited due to the fact that each Java bytecode instruction is interpreted or JIT compiled in real-time, just prior to execution on the processor. As a result, conventional superscalar ILP technologies such as pipelining look-ahead or other techniques for enhancing the execution speed of the resultant machine language instructions are significantly limited when applied to execution of programs written in a language such as Java. Stated differently, bytecode level parallelism does not significantly benefit from conventional techniques exploited by superscalar processors to provide instruction level parallelism.

In addition, the hardware realization of the Java Virtual Machine (JVM) as a bytecode Java processor, which directly executes the bytecode in the hardware using a stack-based hardware architecture, may be faster than the JIT compiled bytecode execution, but executing instructions in parallel in such a hardware bytecode processor is harder because of the inherent sequential nature of bytecodes that are targeted for a stack-based machine, mainly due to stack operand dependency. That is, a major issue in a hardware bytecode execution architecture for direct execution of Java bytecode is that the extent of ILP is limited by the dependencies introduced by stack operands between Java bytecodes. An example best illustrates this problem.

Consider, for example, the Java bytecode code snippet shown below in Table 1 that illustrates how stack dependencies limit ILP in Java bytecodes. In this example, each bytecode instruction is respectively labeled "b1," "b2," and so on.

TABLE 1

Example code and corresponding bytecodes.

| Java bytecodes | | Operand stack contents | |
|---|---|---|---|
| b1 | iload a | a | T1 |
| b2 | iload b | a, b | |
| b3 | mul | t1(=a*b) | |
| b4 | iload b | t1, b | |
| b5 | iload c | t1, b, c | |
| b6 | mul | t1, t2(=b*c) | |
| b7 | add | x(=t1 + t2) | |
| b8 | istore | | |
| b9 | iload a | a | T2 |
| b10 | iload c | a, c | |
| b11 | iload b | a, c, b | |
| b12 | iload d | a, c, b, d | |
| b13 | mul | a, c, t3(=b*d) | |
| b14 | sub | a, t4(=c − t3) | |
| b15 | mul | y(=a*t4) | |
| b16 | istore | | |

The second column in Table 1 above shows the contents of the operand stack after the execution of each bytecode instruction. Note that the labels T1 and T2 indicate traces identified by embodiments of this invention and will be explained shortly. Assume that the operand stack is initially empty. Then, the operand stack contains one or more operands after bytecode instruction b1 and remains non-empty until after instruction b8. Thus the bytecode instructions b1 to b8 have to execute sequentially on a stack machine, as they depend on the contents of the operand stack. Such dependencies are referred to as "stack dependencies". Bytecode instructions starting from b9 are stack-independent of any of the earlier instructions b1 through b8, but in an in-order issue machine b9 cannot be issued until all earlier instructions (b1 to b8) have been issued. Thus, a simple stack machine cannot exploit any bytecode level parallelism in the above sequence. Assuming each instruction takes one cycle to execute, the Java bytecode sequence shown in Table 1 (column 1) will take 16 cycles in a strict stack machine. Accordingly, conventional techniques for increasing performance of the aforementioned example code snippet are severely limited. Conventional folding techniques may be used to somewhat enhance the execution speed, but not to the point of becoming fully parallel.

Embodiments of the invention significantly overcome the aforementioned deficiencies and provide unique mechanisms and techniques to provide for execution of program instructions in parallel, such as by providing mechanisms and techniques that provide for parallel execution of Java bytecode instructions. To do so, embodiments of the invention are based in part on an observation that during execution of Java bytecode, there are periods of time in execution that the operand stack becomes empty or "clean", referred to herein as a clean condition of the stack execution structure. According to embodiments of the invention, a sequence of instructions such as Java bytecodes between any two consecutive cleanstack-points form a bytecode-trace or a "trace". In embodiments of this invention, traces that are not dependent upon one another, as will be explained, can be executed in parallel to increase performance of programs such as Java applications.

Specifically, referring back to the example bytecode sequence in Table 1 above, the operand stack becomes empty after executing instruction b8 and also after instruction b16. More precisely, if the stack pointer is pointing to some position p at the beginning of a Java method or a basic block, then after executing the sequence of bytecode instructions b1 to b8, the stack pointer regains or returns to its old value p. The term "clean-condition" or clean point (e.g., empty operand stack condition) is used herein to refer to a clean stack point, which is a point in time of execution of program code at which the stack-pointer valued is restored to an original clean or empty value relative to an earlier value that occurred at the beginning of a trace. For purposes of this invention, the stack structure is referred to herein as an "execution structure" and embodiments of the invention are not limited to using only a stack as an execution structure. Any type of memory storage structure can be used as an execution structure (e.g., execution unit) in embodiments of this invention.

As noted above, in this invention, the sequence of Java bytecodes between any two consecutive clean-stack-points form a bytecode-trace or a "trace". Since each bytecode-trace is stack independent of every other bytecode-trace, embodiments of the invention can execute multiple bytecode-traces in parallel. In the example code of Table 1 above, there are two bytecode traces: one trace, T1, from b1 to b8 and another trace, T2, from b9 to b16. By taking instructions from different bytecode traces and issuing them in parallel to multiple functional processor execution units, each of which has its own private operand stack execution structure, instruction-level-parallelism can be exploited for applications such as Java programs. This instruction-issue approach is referred to herein in embodiments of the invention as simultaneous multi-trace instruction issue (SMTI). If the bytecodes of traces T1 and T2 in Table 1 are issued in this manner using embodiments of this invention, execution of the entire sequence will require only 8 cycles, in contrast with the 16 needed with in-order single issue stack machine. Application of other enhancement techniques on traces such as folding can further increase performance.

Accordingly, one embodiment of the invention involves a processing device to support parallel execution of multiple instructions. Such a processing device includes both a trace detector and dependency detector. The trace detector identifies traces in a segment of code including successive instructions. Each of multiple identified traces in the segment of code may include a set of instructions capable of being executed on a corresponding execution unit such as an operand stack and associated functional circuitry. Prior to parallel execution of multiple identified traces on corresponding execution units, the dependency detector analyzes the traces identified in the segment of code to determine a dependency order for executing the traces. In general, the dependency order identifies at least one of the traces associated with the segment of code that cannot be properly executed in parallel with another trace in the segment of code. Stated differently, the dependency order indicates which traces can be properly executed in parallel.

As mentioned, one form of determining trace dependency includes analyzing the segment of instructions to identify sequences of instructions that can be executed on an execution unit such as an operand stack. In this instance, the trace detector identifies a beginning trace instruction in the segment of code whose operation corresponds to a first clean condition (e.g., an empty stack condition) of an execution unit. Additionally, the trace detector identifies a subsequent trace instruction in the segment of code whose operation corresponds to a next clean condition (e.g., a condition in which the operand stack would be empty again).

The segment of code including instructions between and including the beginning trace instruction and end trace instruction identifies a particular trace in the segment of code. Data dependencies may exist between identified traces. The identified traces may each include a sequence of contiguous instructions intended to be executed successively in time. The dependency order indicates which of the multiple traces must be executed before others identified in the segment of code. For example, a younger trace (e.g., a trace including a sequence of code originally intended to be executed first in a series of traces) may be executed in parallel with other elder traces (e.g., traces including a sequence of code originally intended to be executed after the first trace) as long as there are no data dependencies (e.g., use of the same logical variables in for different traces of the code that would cause a conflict). According to the above example, T1 is an example of an younger trace (e.g., an early trace) and T2 is an example of a respective elder trace (e.g., and elder trace).

The parallel processing device may include a scheduler that schedules parallel execution of traces detected within a basic block of, e.g., JAVA code on multiple execution units according to the dependency order. The trace detector may identify the dependency order based at least in part on operand stack dependencies associated with portions of the segment of code.

In one embodiment, the processing device for executing instructions in parallel further includes a fetcher that fetches multiple code instructions from different traces identified in the segment of code. A decoder decodes the multiple fetched code instructions into corresponding bytecode instructions (e.g., JAVA bytecode instructions) that are stored in a buffer unit including multiple buffers or queues dedicated for storage of bytecode instructions associated with the multiple traces. Each queue at least temporarily stores bytecodes in a trace to be executed on a corresponding execution unit.

Further to the aforementioned embodiments and in yet other independent embodiments, the processing device may include multiple execution units to execute multiple traces in parallel based on the dependency order. A buffer (or scratch pad area) temporarily stores results associated with execution of multiple executed traces. At run-time of executing multiple traces in parallel, a comparator circuit is employed in real-time to identify an out-of-order memory dependency condition associated with parallel executed traces resulting in an error. For example, not all data dependencies may be detected prior to run-time. Hence, blind execution of the traces in parallel may produce erroneous results. To alleviate this problem, the buffer temporarily stores results associated with execution of traces until after it is known that a an out-of-order memory dependency condition did not occur. For example, the comparator circuit, in response to identifying the out-of-order memory dependency condition: squashes execution of elder traces in the segment of code that depend on results from earlier traces, clears results in the temporary buffer associated with the squashed traces, and reschedules squashed traces for later execution. Based on this technique, traces that are erroneously executed out of order (because a dependency was not detected prior to run-time) can be rescheduled for execution without corrupting all original data values. If no out-of-order data dependencies are detected at run-time, the results of executing a trace temporarily stored in the buffer can be transferred to memory.

The dependency detector analyzing the traces in the segment of code may determine a dependency order (at least one level of dependency) by comparing memory access instructions in a first trace to memory access instructions in other traces identified in the segment of code. Based on a comparison, the dependency detector may identify a potential trace dependency (such as a data dependency) in which a first trace contains access to a variable also accessed by another trace identified in the segment of code. Access to the same variable by different (elder and younger traces) but simultaneously executed traces may result in a conflict such that execution of code in parallel does not produce the same result as when the same code is executed in program order on a single processor. In other words, two different segments of code may utilize a common variable or value stored in memory. Execution of the younger trace (e.g., a trace disposed earlier in execution order) may normally be expected to produce a resulting value on which a latter trace depends. If the latter trace retrieves the value (whether in memory or a variable register) before the younger trace performs and stores a computation result, the latter trace cannot be properly executed until after the younger trace performs its computation.

Trace dependencies detected at run-time include out-of-order memory dependencies such as: i) a READ after a WRITE to the same memory address for different parallel executed traces, ii) a WRITE after a READ to the same memory address for different parallel executed traces, and iii) a WRITE after a WRITE to the same memory address for different parallel executed traces.

After completing execution of a trace, the trace scheduler can update the trace dependency structure to remove any trace dependencies associated with other traces in the set of traces that are dependent upon completion of execution of a trace that is now finished executing. The trace dependency structure can contain all information about trace identification, beginning and ending instruction addresses (e.g., Program Counter locations), and other information.

After embodiments of the invention have identified sets of traces within a segment of code and have identified all traces within all segments of code within a program, and have further identified dependencies between traces, embodiments of the invention can operate a trace scheduler in conjunction with a trace executer to schedules and cause execution of traces within the set of traces in parallel and in an execution order that is based on the identified dependency order, such that at least two traces are executed in parallel and such that if the dependency order indicates that if a second trace is dependent upon a first trace, the first trace is executed prior to the second trace. In other words, the trace scheduler can access a trace dependency structure to determine which traces are dependent upon which other traces and can initiate execution of non-dependent traces in parallel. Accordingly, two traces that are not dependent on each other and that are not dependent upon other traces in a basic block or in a thread can execute in parallel thus increasing execution speed of the program. It is to be understood that if there is only one trace available (e.g., remaining) to schedule and execute, the trace scheduler of this invention can select and schedule this trace alone. A significant benefit of the invention is that when there is more than one trace available for scheduling, and the traces are not dependent on the other, the scheduler can schedule both traces for execution. Note that if there are functional units in a trace processor that can handle execution of more than two traces are one time (e.g., three, four or more), and such traces are available for execution, embodiments of the invention are able to schedule and execute more than two traces in parallel.

Based on use of the techniques explained herein, embodiments of the invention significantly improve execution time of programs that are execution structure dependent such as Java bytecode programs that rely on a stack-based execution architecture for performance within a computerized device.

Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application that, when performed on the processor, produces a trace code analyzer process that causes the computerized device to perform any and/or all of the method embodiments, steps and operations explained herein as embodiments of the invention to allow parallel execution of instructions in a computer program such as a Java application. In other words, a computer, processor or other electronic device that is programmed to operate embodiments of the invention as explained herein is considered to be an embodiment of the invention.

Other arrangements of embodiments of the invention disclosed herein include software programs to perform the method embodiment steps and operations summarized above and disclosed in detail herein. As an example, a software application configured to operate as a trace processor as explained herein is considered an embodiment of the invention. The trace processor does not have to be a hardware microprocessor, but can be implemented, for example, within a Java Virtual Machine. More particularly, a computer program product is disclosed which has a computer-readable medium including computer program logic encoded thereon that, when executed on at least one processor with a computerized device, causes the processor to perform the operations (e.g., the methods) indicated herein as embodiments of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computer system, a data processing system or other device to cause the computer system to perform the techniques explained herein as embodiments of the invention including both the trace and trace dependency identification aspects of the invention as well as the run-time dependency detection, scheduling, and execution aspects. A Java virtual machine and a Java processor incorporating a trace processor functionality as explained herein are considered embodiments of the invention.

It is to be understood that the system of the invention can be embodied strictly as a software program, as software and hardware, or as hardware or circuitry alone and may be a combination of such elements in a single device or distributed within a system such as a software development or an equivalent system.

BRIEF DESCRIPTION OF THE DRAWINGS

The foregoing and other objects, features and advantages of the invention will be apparent from the following more particular description of preferred embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
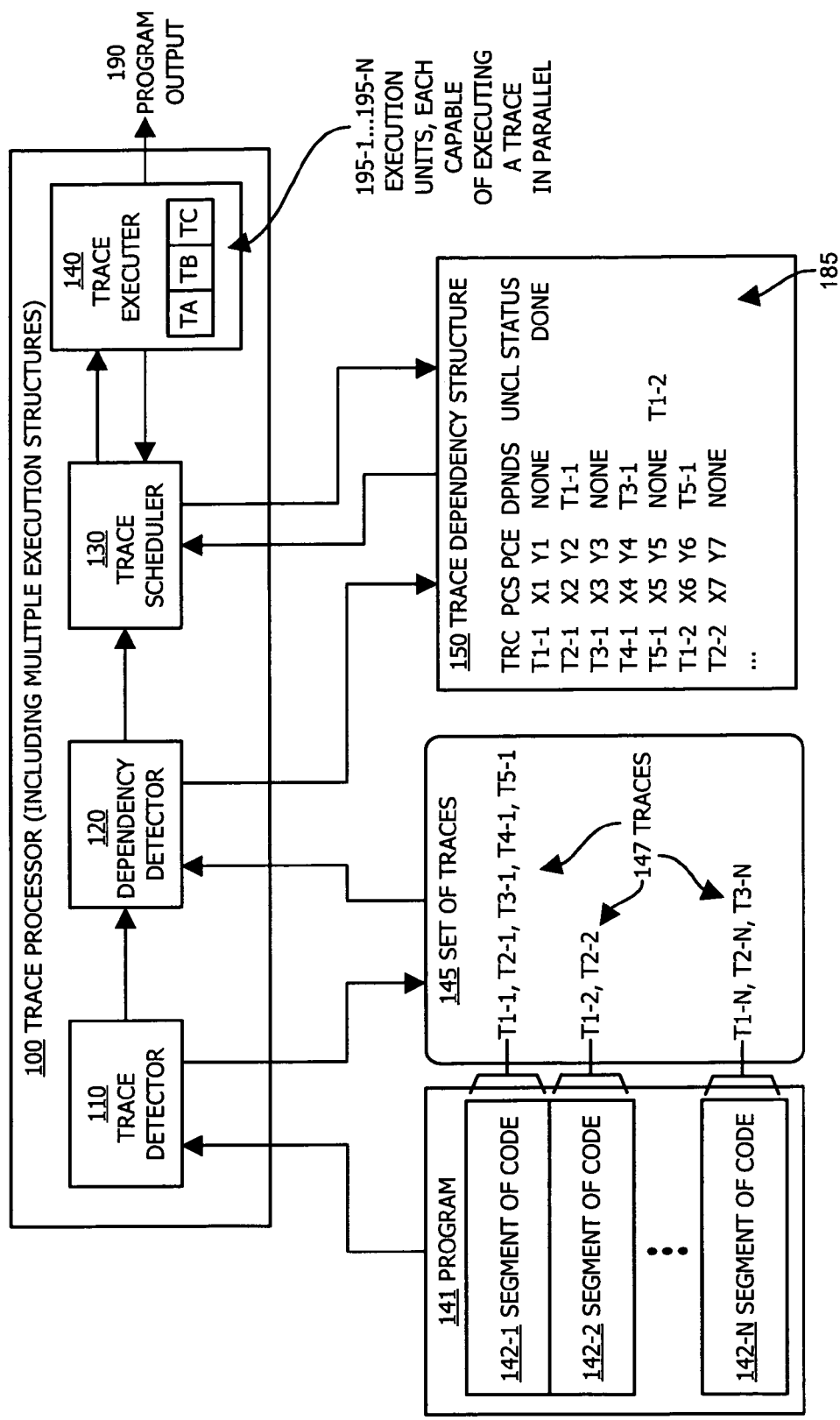
FIG. 1 is a block diagram of a processor device that processes multiple instructions in parallel according to an embodiment of the invention.

Embodiments of the invention provide techniques (e.g., both hardware and software) for executing instructions of a software program in parallel when such instructions are performed using a parallel execution structure-based processing paradigm. In one application, the parallel execution structure is based on a stack-based execution architecture executing Java bytecode instructions. More particularly, embodiments of the invention are based in part on an observation that during execution of instructions within a segment of code, there are instances or points in time at which an execution structure such as a stack begins in a clean state (e.g., an empty operand stack) and returns to the clean state after execution of a series of instructions.

The series of instructions between two clean states of an execution structure such as a stack is referred to herein as a "trace". As an example, consider a Java thread of bytecode instructions that utilize a stack during operation within a Java virtual machine or on a Java processor. Initially, the stack associated with this thread is empty which represents an initial stack clean condition, clean location or clean point. However, during execution of bytecode instructions within the thread, the stack may grow and shrink as the Java virtual machine or Java processor pushes and pops parameters onto and off of the stack for processing. During operation (i.e., execution) of instructions in this manner, there may be situations in which the stack pointer returns to its original clean condition (e.g., an empty operand stack). The set of instructions beginning with the first instruction corresponding to the initial, previous or first stack clean condition and up to and including the instruction corresponding to the second stack clean condition represent a single "trace" of instructions according to embodiments of the invention.

Since at the end of a trace, when the stack pointer has returned to its initial position, instructions that are subsequently executed from this position and continuing on within the segment of code represent another trace of instructions bounded by the ending of the former trace that serves as a beginning stack clean condition for the next trace. In other words, each trace of instructions is bounded by a stack clean condition (e.g., empty stack condition) and a single stack clean condition can serve as the end of one trace and the next instruction can serve as the beginning of the next trace. As each trace set of instructions is identified, it is assigned a trace number and thus traces identified earlier are considered younger traces of traces identified later within instruction flow of a program.

Embodiments of the invention generally operate to identify a complete set of traces of instructions that exist throughout segments of code within a program such as a Java application. By identifying the set of traces within all segments of code within the program, and since each trace represents a sequence of instructions within a segment of code that are execution structure (i.e., stack) independent from each other, traces that are stack independent from each other. In other words, since the series of instructions in a trace are bounded by stack clean conditions, those instructions do not affect stack contents of other instructions within other traces. Thus, there exists an operation stack dependency for instructions within a single bytecode trace. A single bytecode trace is operation stack independent from other bytecode traces. Embodiments of the invention utilize this observation to provide flexibility of scheduling execution of entire traces (i.e., series of instructions bounded by stack clean points) onto different functional units that each contain respective operand stacks in a trace processor and a trace executer can thus provide parallel or concurrent execution of different traces at the same time.

The identification of traces prior to execution removes the operation stack dependency between series of instructions within different traces. However, it should be noted that that other dependencies may exist that can restrict the ability to execute traces in parallel. One of such other dependencies is an inter-trace dependency referred to herein as a variable access dependency, memory access dependency, or data dependency in which one trace accesses variables or data associated with another trace. Certain trace dependencies may be detected at run-time while others are detected prior to execution.

Since such data dependencies may exist between traces, after embodiments of the invention operate to identify the set of traces within segments of code in a program, embodiments of the invention then operate to identify a dependency order between traces within the identified set of traces. Generally, the dependency order indicates traces that are dependent upon operation of other traces in the segment of code. This processing involves performing a local variable dependency analysis to identify the dependencies of local variables that can exist across different traces within the set of traces. In particular, to detect inter-trace local variable dependency, every local variable accessing instruction of a trace should be compared with every other traces, with respect to trace number. As an example, if a first identified trace references a variable using a write instruction and the second trace uses a read instruction to read that same variable, a read-after-write dependency condition arises and the second trace may be dependent upon the first trace. Embodiments of the invention store this information in a trace dependency structure that may be a table, list, or other data structure in memory. In such cases, embodiments of the invention will ensure that the first trace is scheduled and executed prior to the second trace.

After identifying the set of traces in a program and after identifying the dependency order between traces, embodiments of the invention are capable of executing certain traces within the set of traces in parallel using a trace executer that includes multiple functional execution units that each maintain a separate respective stack for execution of a trace of instructions. In other words, embodiments of the invention provide a trace executer that can support parallel execution of separate traces such that two or more traces can be executed in parallel depending upon the number functional units available, each providing a separate execution structure such as an operand stack. A trace scheduler can utilize the dependency order in order to schedule execution of the traces within the trace executer. If the dependency order indicates, for example, that a second trace is dependent upon a first trace, the trace scheduler can execute these traces on the trace executer such that the first trace is executed prior to the second trace in order to avoid issues associated with the dependencies between those two traces.

As will be explained further, embodiments of the invention also identify situations in which a segment of code such as a basic block or a Java thread ends (e.g., has no more instructions) prior to the occurrence of a stack clean condition in a trace, thus indicating the end of a trace but an unclean stack. Such a condition is referred to herein as a non-clean trace and a non-clean condition. That is, situations may arise in which embodiments of the invention have detected a clean condition indicating the beginning of a trace, and, while attempting to find a subsequent bytecode instruction that corresponds to a subsequent clean condition (to indicate the end of that trace), embodiments of the invention encounter the end of a segment of code such as the end of a Java basic block or the end of the thread. In such cases, embodiments of the invention can indicate that the current trace is a non-clean trace and can end that trace at that instruction (i.e., at the end of the basic block or the end of the thread) and can further indicate that a subsequent trace beginning with the next instruction to which control would be transferred during execution is also a non-clean trace. If the instruction ending the basic block or the thread can transfer to multiple execution locations, such as the beginning of two different threads (i.e., a branch conditional), then each trace created beginning with those two distinct branch locations is also marked as a non-clean trace as well. Embodiments of the invention can operate to ensure that non-clean traces are all executed using the same execution structure (e.g., operand stack) since non-clean traces are execution structure dependent upon each other when one non-clean trace follows execution of a former non-clean trace.

As mentioned, certain trace dependencies may be detected at run-time rather than prior to execution. For example, traces may be executed in parallel even though parallel execution of the traces may produce an erroneous result compared to executing the same code on a single conventional execution unit. Thus, in some respects, execution of traces according to an embodiment of the invention is speculative to the extent that it may not be known for certainty prior to execution whether there exists a trace dependency. To ensure proper execution of code executed out-of-order, logical results associated with execution of multiple traces are temporarily stored in a buffer such as a scratchpad area. At run-time of executing the multiple traces in parallel, a comparator circuit is employed (e.g., in real-time) to identify an out-of-order memory dependency condition associated with parallel executed traces resulting in an error. For example, a data dependency may exist when a younger trace executed in parallel with an elder trace both use the same data value stored in memory. If the elder trace retrieves the data value (and processes it) before the younger trace that should have otherwise modified the data value during normal execution of in-line code instructions, execution of the elder trace may produce an erroneous result because technically the younger trace should have been executed before the elder trace.

To alleviate possible data corruption caused by out-of-order execution of code, the buffer temporarily stores results associated with execution of traces until after it is known that an out-of-order memory dependency condition did not occur during parallel execution of traces. More specifically, the comparator circuit compares addresses associated with reads and writes of parallel executed traces, and in response to identifying the occurrence of an out-of-order memory dependency condition: squashes execution of younger traces in the segment of code that depend on results from earlier traces, clears results in the temporary buffer associated with the squashed traces, and reschedules squashed traces for later execution. If no out-of-order data dependencies are detected at run-time of parallel executed traces, the results of an executed trace temporarily stored in the buffer can be transferred to memory. Based on this technique, traces that are erroneously executed out of order (because a dependency was not detected prior to run-time) can be rescheduled for execution without corrupting original data values.

FIG. 1 is a block diagram of trace processor 100 configured according to one embodiment of the invention. Trace processor 100 in this example includes a trace detector 110, a dependency detector 120, a trace scheduler 130, and a trace executer 140. As shown, the trace executer 140 includes a plurality of functional execution units 195-1 through 195-N. Execution units 195 may be configured to include an operand stack but this may vary depending on the application. The operational functionality of each of these components of trace processor 100 will be explained in more detail herein.

Generally, the trace processor 100 represents either a combination of hardware/software or a hardware instantiation of functionality explained herein. In particular, at a high-level, the trace detector 110 operates to identify a set of traces 145 within segments of code 142 in a software program 141 (e.g., code associated with a single software application). After trace detector 110 identifies a set of traces 145, the dependency detector 120 operates to detect data and local variable dependencies between individual traces 147 within the set of traces 145. The dependency detector 120 stores this dependency information in a trace dependency structure 150. After the trace dependencies are identified, the trace scheduler 130 can schedule execution of the individual traces 147 in a parallel manner on the trace executer 140, while taking into account trace dependencies identified in the trace dependency structure 150.

The trace executer 140 includes a plurality of execution units 195 (further discussed in the embodiment shown in FIGS. 2 and 5) that each represent processing resources optionally used to execute a trace 147 of instructions in parallel, but independently of other traces that may be concurrently executing in parallel on another execution unit 195. Resources of each execution unit 195 include an operand stack to store information regarding execution of a sequence of instructions in a trace. The trace executer 140 thus executes the traces 147 in parallel in order to produce program output 190 and uses the respective execution units 195 (e.g., labeled TA, TB, and TC in this example) to simultaneously execute up to three traces 147 in parallel. Although, there are only three execution units 195 shown for executing traces in parallel, the actual number execution units 195 in trace processor 100 may vary depending on the application.

As traces 147 complete execution in respective execution units 195, the trace executer 140 provides execution status information 185 back to the trace scheduler 130. In response to completing execution of traces 147, trace scheduler 130 updates execution status information 185 in the trace dependency structure 150 in order to reflect completion of execution of certain traces 147. This execution status information 185 allows the trace scheduler 130 to then schedule subsequent traces 147 for execution in the now free functional unit (free for use by another trace when one trace completes execution). Traces 147 scheduled for later execution may be dependent upon completion of execution of other traces 147.

For purposes of discussion of example embodiments of the invention, the instructions within segments of code 142 are Java bytecode instructions and each segment of code 142 is a sequence of Java bytecode instructions that form, for example, either a Java basic block or a Java thread within a Java program. In addition, each execution unit 195 includes a respective functional processing logic that, in this example, is an operand stack execution structure that the multiple execution structure trace processor 100 uses to perform the Java bytecode instructions in parallel by executing multiple traces 147 at the same time. Each trace 147 in the set of traces 145 is a sequence of Java bytecode instructions that are operand stack independent from a remainder of Java bytecode in that segment of code 142.

Figure 2:
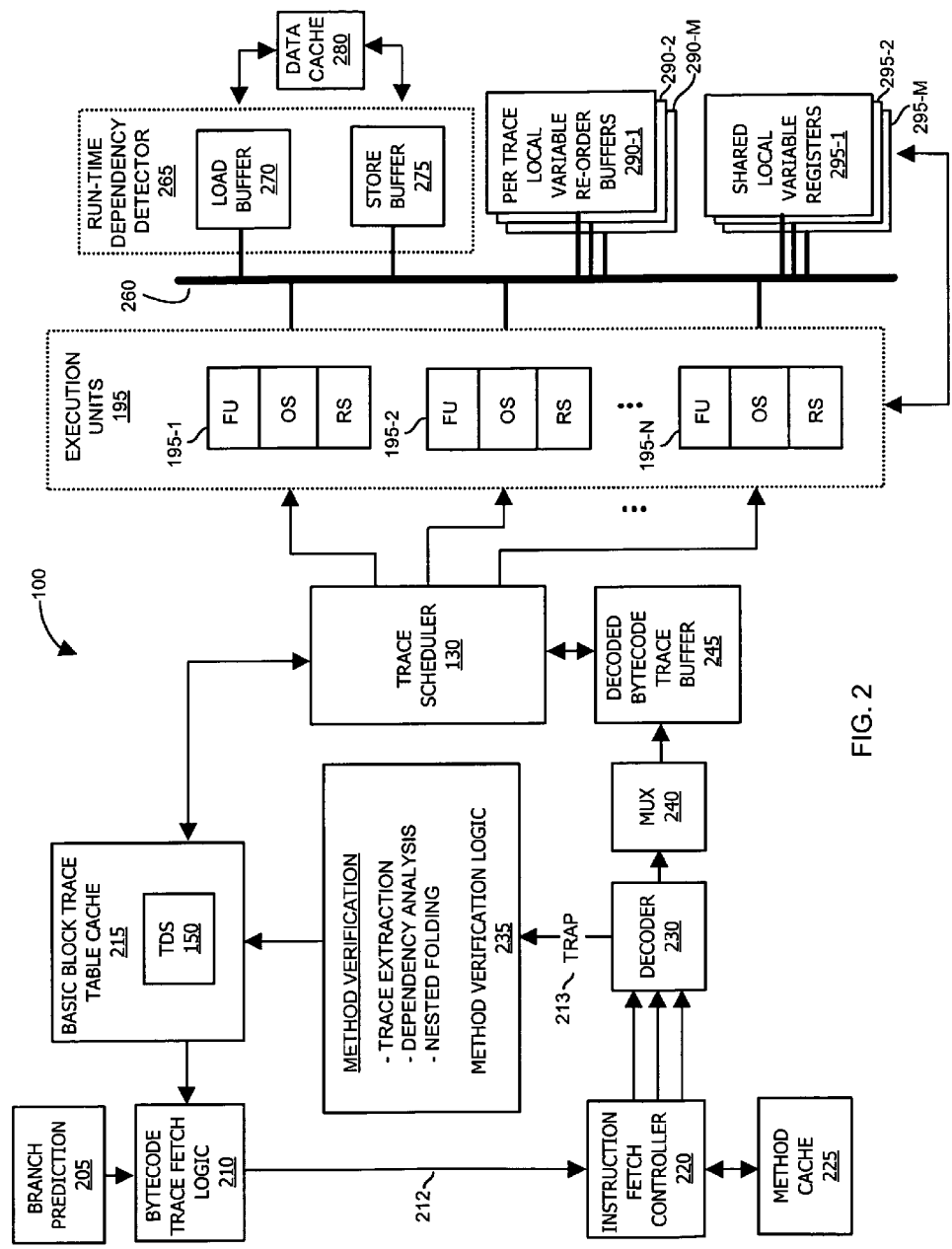
FIG. 2 is a more detailed block diagram of a processor device (in FIG. 1) that processes multiple instructions in parallel according to an embodiment of the invention.

FIG. 2 is a more detailed block diagram of trace processor 100 (in FIG. 1) according to an embodiment of the invention. As shown, trace processor 100 includes branch prediction module 205, bytecode trace fetch logic 210, instruction fetch controller 220, method cache 225 (e.g., bytecode cache), decoder 230, method verification logic 235, basic block trace table cache 215, multiplexer 240, decoded bytecode trace buffer 245, trace scheduler 130, execution units 195-1, 195-2, ..., 195-N, interconnect bus 260, run-time dependency detector 265, load buffer 270, store buffer 275, data cache 280, per trace local variable re-order buffers 290, and shared local variable register 295. Trace processor 100 may be viewed in one embodiment as a five stage processor pipeline device with instruction-fetch, decode, issue, execute and store/commit stages.

In general, instruction fetch controller 220 fetches instructions from a method cache 225. Bytecode-trace fetch logic 210 uses the trace information in TDS 150 of the BBTT (Basic Block Trace Table) cache 215 to select traces 147 that are free from local variable dependencies. During a fetch process, bytecode trace fetch logic 210 may fetch N program counters associated with N corresponding traces stored in basic block trace table cache 215 to order instruction fetch controller 220 to fetch corresponding instructions from multiple locations in the method cache 225. Trace information includes identity of a trace, beginning and ending instructions of a trace 147, etc. Such traces 147 may be selected from the same basic block or different basic blocks for possible parallel execution. For the latter case of selecting traces from different basic blocks, method verification logic 235 (e.g., bytecode trace dependency analyzer) analyzes a larger window of bytecode instructions of two or more basic blocks.

Bytecode trace fetch logic 210 forwards program-counter values 212, indicating a start and end of selected traces 147, to instruction fetch (IF) controller 220, which then simultaneously or individually fetches the bytecode instructions from the method cache 225. After fetching the traces 147 of a basic block of code, the bytecode trace fetch logic 210 starts selecting the traces 147 from the next basic block as predicted by the branch predictor. In the present embodiment, we assume use of, for example, a 2-bit branch prediction using a Branch Prediction Table (BPT) 205.

To start the method verification process, decoder 230 invokes trap 213. For example, decoder 230 generates trap 213 when a method invocation bytecode (e.g., an instruction such as INVOKEVIRTUAL, INVOKEINTERFACE, INVOKESTATIC, INVOKESPECIAL) is encountered in decoder 230 and the target method is called for the first time. Method verification logic 235 starts the method verification process including trace extraction, inter-trace dependency analysis, and instruction folding of instructions on one or more basic blocks of code.

Note that trace extraction and inter-dependency analysis may be performed in software, in hardware, or in a combination of hardware/software. This is a matter of design choice and depends upon available chip space and circuit complexity issues. Also, note that more specific details associated with the method verification process (e.g., trace extraction, inter-dependency analysis, and instruction folding) are discussed in connection with FIGS. 11-15 later in this specification.

As mentioned, trace processor 100 includes decoder 230 (such as or similar to a picoJava-II decoder that is a JAVA processor from Sun Microsystems) to handle both bytecode instructions and folded instructions. Decoder 230 decodes multiple instructions and stores them via multiplexer 240 in decoded bytecode trace buffer 245, which is implemented as multiple separate buffers (e.g., queues) to separately hold decoded instructions from each trace.

Figure 3:
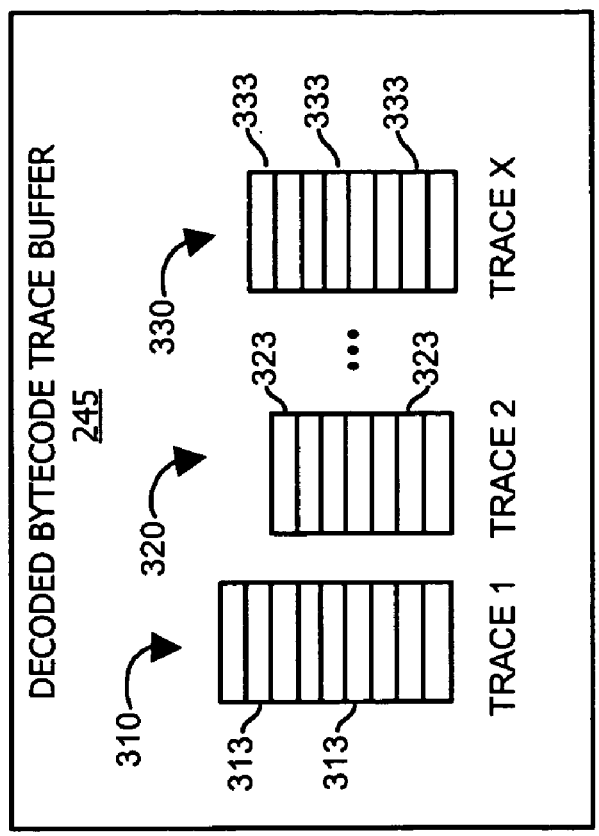
FIG. 3 is a block diagram of a trace buffer for storing instructions associated with traces according to an embodiment of the invention.

FIG. 3 more particularly illustrates a decoded bytecode trace buffer 245 according to an embodiment of the present invention. As shown, queue 310 stores instructions 313 (such as JAVA bytecodes) associated with TRACE 1, queue 320 stores instructions 323 associated with TRACE 2, queue 330 stores instructions 333 associated with TRACE X, and so on. In one application, the number of queues 310, 320, 330, is twice the issue width, which is the maximum number of instructions that the trace scheduler 130 can issue in a single cycle.

Referring again to FIG. 2, trace scheduler 130 assumes that certain traces 147 (such as TRACE 1, 2, ..., X) stored in decoded bytecode trace buffer 245 have no stack dependencies and can be executed in parallel via corresponding execution units 195. In addition to being stack independent, the fetched traces 147 may have been pre-checked for local variable dependencies. For example, traces 147 may be checked prior to execution to identify traces that utilize common variables stored in shared local variable register 295.

Among the traces 147 stored in decoded bytecode trace buffer 245, the trace scheduler 130 selects traces 147 for execution based on a priority function (e.g., early traces with no dependencies are executed first) depending on the available processing resources; such a function can be based on the trace identifications. As mentioned, trace scheduler 130 schedules traces (based on trace information stored in basic block trace table cache 215 for one or multiple basic blocks) based on uses trace dependency structure 150, which includes dependency order information identifying which traces can be executed in parallel and which must be executed after others. The instruction issue (e.g., execution) order within a (bytecode) trace 147 is generally in-order, whereas instruction issue between (bytecode) traces 147 can be out-of-order.

When trace scheduler 130 selects a trace for execution, trace scheduler 130 assigns the trace 147 to a dedicated execution unit 195. An execution unit 195 may include a FU (Functional Unit), OS (Operand Stack), and a RS (Reservation Station). For each of multiple selected (bytecode) traces 147, one instruction from each trace 147 is issued to a dedicated RS. The trace scheduler 130 maintains sufficient trace program-counters to keep track of the issued traces and which instructions stored in queues 310, 320, and 330 have been executed and which have not yet been executed.

Figure 4:
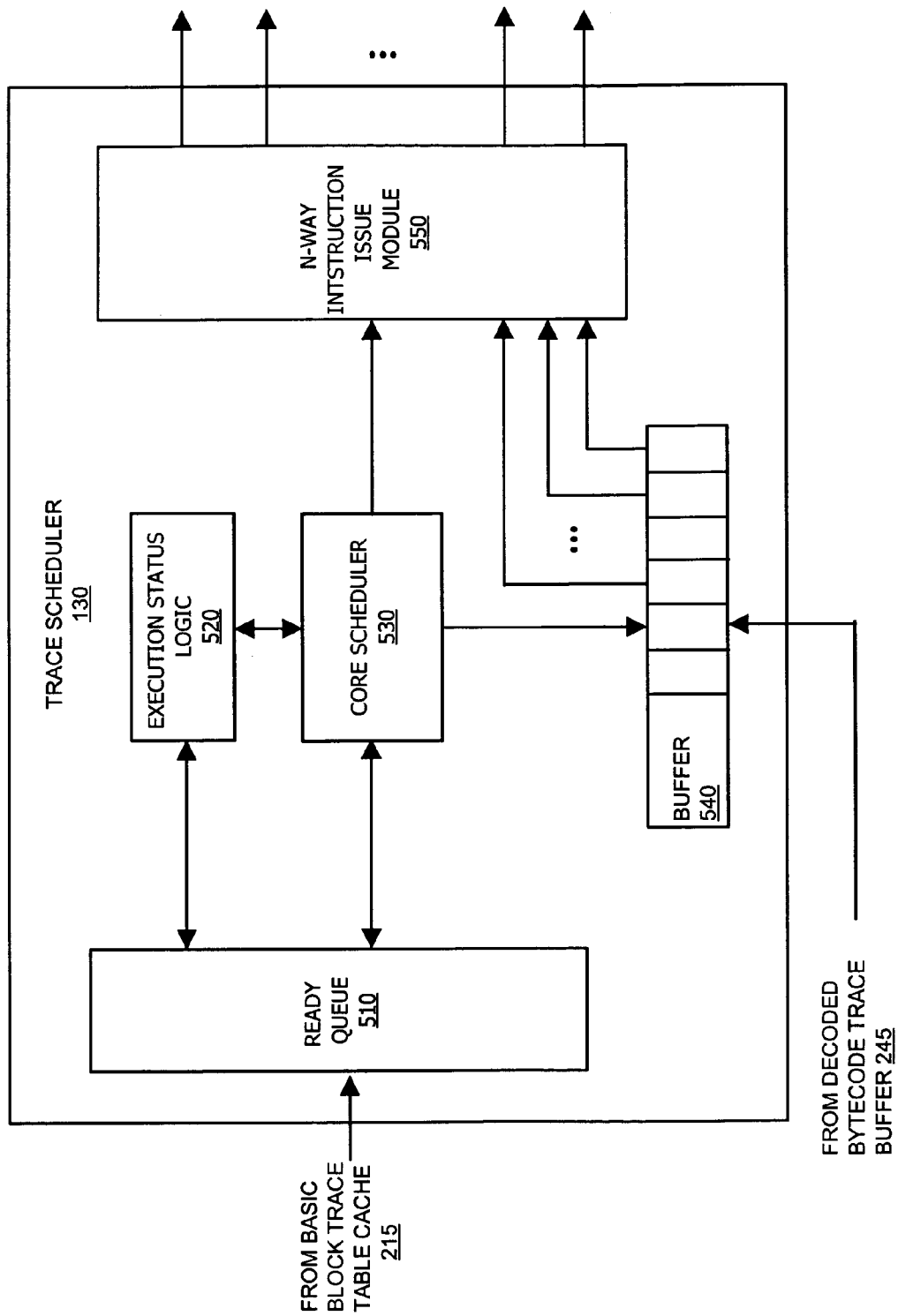
FIG. 4 is a more detailed block diagram of a trace scheduler according to an embodiment of the invention.

FIG. 4 is a block diagram, more particularly illustrating details of trace scheduler 130 according to an embodiment of the present invention. As shown, trace scheduler 130 may include circuitry such as a ready queue 510, execution status logic 520, a core scheduler 530, a buffer 540, and an n-way instruction issue module 550 (e.g., n=number of execution units 195 to which instructions are issued for different traces).

Status information such as trace dependency structure 150 associated with traces in a Basic Block (at least part of which are to be scheduled for parallel execution) are fetched from basic block trace table cache 215 and are stored in ready queue 510. As mentioned, trace information (e.g., trace dependency structure 150) stored in basic block trace table cache 215 may include information such as trace id, dependency with respect to other traces, etc for a currently executed method.

Execution status logic 510 maintains status information regarding the status of whether resources such as execution units 195 are presently free or in use. For example, execution status logic may track which traces 147 are presently being executed by a corresponding execution units 195. Execution status logic 510 also manages the status of operand stacks (OS), functional units (FU), reservation stations (RS) and other execution pipeline resources.

During operation, ready queue 510 assigns an operand stack (OS) to the traces 147 that speculatively have no dependency on other simultaneously executing traces. Operand stack assignment (e.g., which trace shall be executed by which execution unit 195) is done by consulting with the execution status logic 520. For traces that can be presently executed, ready queue 510 sets a READY status bit to traces that are awaiting execution and which have no known trace dependency on other traces.

Core scheduler 530 controls transactions with basic block trace table cache 215 and decoded bytecode trace buffer 245. Additionally, core scheduler 530 also controls transactions between other modules in trace scheduler 130 and n-way instruction issue module 550.

During the execution process, trace scheduler 130 fetches a bytecode (e.g., an executable instruction) from a READY trace is fetched from decoded bytecode trace buffer 245 for temporary storage in buffer 540. As shown, n-way instruction issue module 550 issues multiple instructions in buffer 540 for parallel execution. For example, up to n-instructions, each from a different trace, are selected and issued (via n-way instruction issue module 550) to corresponding execution units 195 from buffer 540 that temporarily stores multiple instructions from decoded bytecode trace buffer 245. In certain cases, not all execution units 195 will be executing instructions in a particular process cycle.

Prior to execution, core scheduler 530 analyzes each selected instruction from buffer 540 and its associated execution status logic 520 to check whether there are sufficient resources at the execution stage (e.g., execution units 195) to proceed with execution. When processing resources such as execution units 195 are available, core scheduler 530 issues the instructions temporarily stored in buffer 540 to the corresponding Reservation Station (RS) associated with the execution unit 195 via n-way instruction issue module 550.

Figure 5:
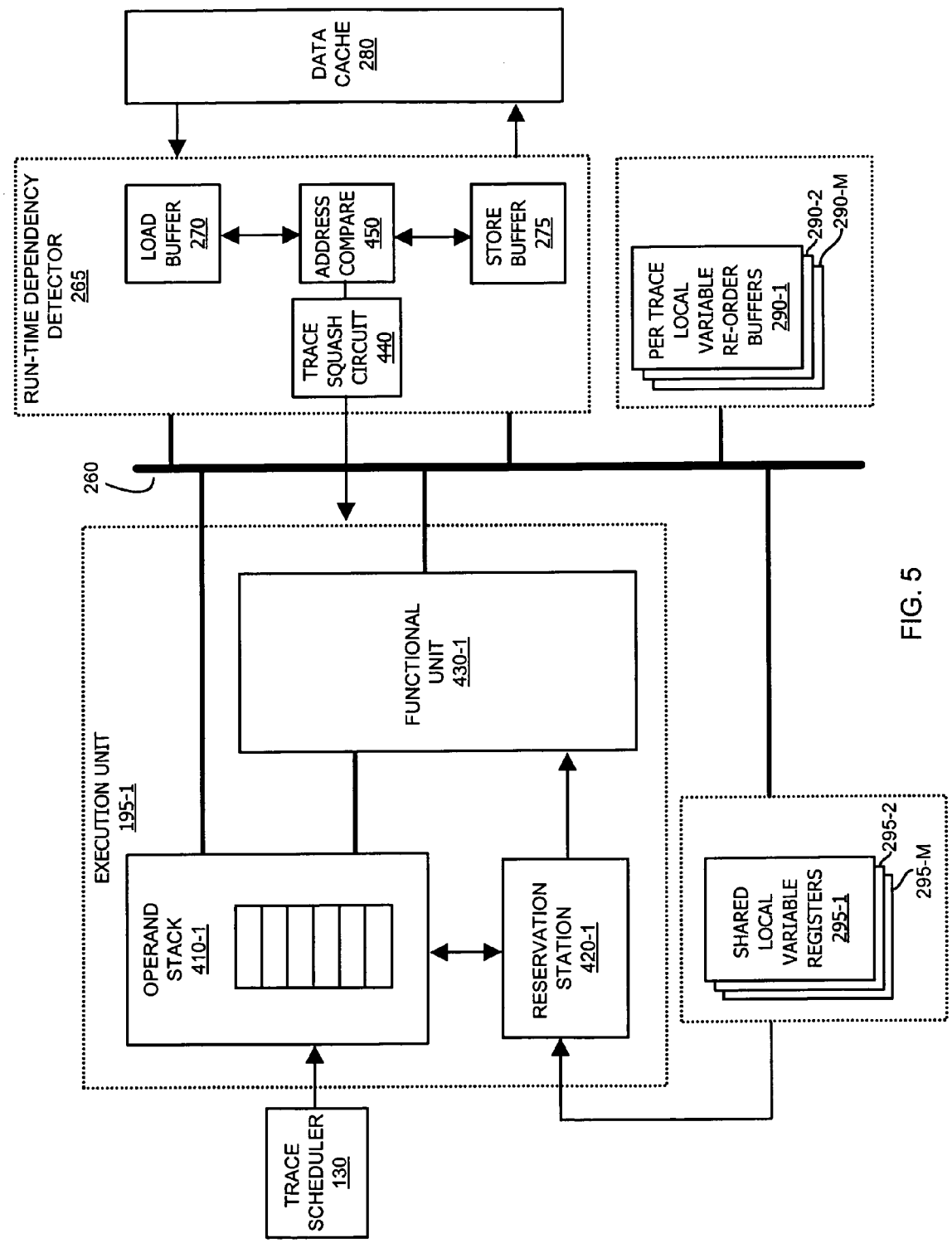
FIG. 5 is a more detailed block diagram of an execution unit according to an embodiment of the invention.

Turning attention to a more detailed embodiment, FIG. 5 is a block diagram more particularly illustrating details of an execution unit 195 (as in FIGS. 1 and 2) and related circuitry. As shown, execution unit 195 includes an operand stack 410-1, reservation station 420-1, and a functional unit 430-1. Run-time dependency detector 265 includes load buffer 270, store buffer 275, address compare module 450, and trace squash circuit 440. It should be understood that FIG. 5 implicitly includes multiple execution units 195 similar to that shown in FIGS. 1 and 2. The other execution units 195-2, 195-3, etc. are not shown in FIG. 5 due to space limitations.

During operation, reservation station 420-1 associated with execution unit 195-1 stores a presently executed instruction associated with a particular trace. Based on a present instruction, reservation station 420-1 controls the operand movement associated with a bytecode from various locations. For example, a push/pop instruction may call for an operand to be moved to/from the operand stack 410-1. When executing an ILOAD instruction, reservation station causes the operand to move from a shared local variable registers 295 (LV-Reg) to the operand stack 410-1 or to a corresponding functional unit 430-1 depending on the instruction. The reservation station 420-1 may also control the movement of operands among operand stack 410-1, LV-Reg 295, run-time dependency detector 265, and functional unit 430-1.

In the embodiment shown, the operand stack 410-1 is implemented as a register stack cache, similar to that implemented in a picoJava-II processor. Such a configuration enables simultaneous access to different operand stacks 410 in parallel as previously discussed.

Functional unit 430-1 includes adders/multipliers/logical arithmetic units to perform integer/floating-point operations on operands in the operand stack 410-1. Generally, interconnect 260 such as a shared bus provides a medium for transferring data among modules. For example, reservation station 420-1 moves operands into the stack and then controls functional unit 430-1 to perform an operation on them.

As mentioned, shared local variable registers 295 (LV-Reg) stores local variables associated with the traces. Access to the variables stored in local variable registers 295 are shared across traces. Consequently, each of multiple execution units 195 may access the same variables in the LV-Reg 295. Selection of how many read/write ports shall be associated with these registers depends on overall performance expectations.

Run-time dependency detector 265 includes a load buffer 270, store buffer 275, an address compare module 450, and a trace squash module 440. In general, the combination of these modules support detection of memory dependencies not detected prior to execution of the traces. Trace dependencies resulting from use of common local variables stored in shared local variable registers 295 can be detected prior to run time as previously discussed. On the other hand, a dependency analysis performed by method verification logic 235 may not detect memory dependencies (e.g., those based on utilization of common data stored in data cache 280) among traces prior to run-time. As its name suggests, run-time dependency detector 265 serves the purpose of detecting memory dependencies at run-time. Generally, address compare module 450 identifies conflicts based on a history of reads and writes associated with traces executed in parallel. If reads and writes result in a conflict, address compare module flags the condition as a hazard.

In response to detecting a hazard (e.g., a memory dependency not detected prior to execution of the traces), the trace squash module 440 of run-time dependency detector 265 implements a recovery routine effecting trace scheduler 130. For example, when a run-time dependency is detected, trace squash module 440 issues a command to stop (e.g., squash) trace execution of further instructions in the event of detecting a run-time dependency and reschedules squashed traces for later execution. Additionally, trace squash circuit 440 clears operand stack 410 in the execution unit 195 executing the trace to be squashed.

Per-trace local variable reorder buffers 290 (LV-ROB) temporarily stores data for modification in the LV-ROB 290 rather than modifying data in the shared local variable register 295. This technique of temporarily buffering the data and storing modified data in LV-ROB 290 and using it as a scratchpad ensures that variable values are not corrupted and lost forever in the event that a variable dependency between multiple traces was not caught prior to execution. Note that traces from a same method shares a set of local variable register 295. For example, traces of a first method may utilize shared local variable registers 295-1, traces of a second method may utilize shared local variable registers 295-2, and so on.

If a trace dependency of presently executed traces is detected at run-time, effected traces are squashed and original data is again retrieved from the shared local variable registers 295 (instead of using potentially corrupted data values stored in load buffer 270 and store buffer 275) when executing the rescheduled traces. Without this ability to backtrack and amend erroneous results of a speculatively executed set of traces in parallel, processing of instructions may result in irreversible execution errors. Note that when a trace is squashed by squash circuit 440, computational values temporarily stored in buffers (e.g., load buffer 270 and store buffer 275) of run-time dependency detector are cleared.

In one embodiment, all WRITEs to corresponding local variable registers by speculatively executed traces are written to the LV-ROB 290 instead of the LV-Reg 295. One set of per trace local variable re-order buffers 290 may be maintained for each set of shared local variable registers 295. For example, traces of a first method share use of an LV-ROB 290-1, traces of a second method share use of an LV-ROB 290-2, and so on instead of using LV-Reg 295-1, 295-2, etc. All READs to a local variable register as a result of speculatively executing a trace are passed through an appropriate LV-ROB 290 to ensure that it reads the correct data updated from its earlier (non-speculative) trace, if any. When a non-speculative trace completes its execution, all the modified local variable entries resulting from a completed trace and its elders (e.g., latter scheduled traces) are eventually written to corresponding LV-Regs 295.

A specific implementation of LV-ROB 290 may be similar to a register file implementation in a typical processor architecture. A number of read/write ports associated with LV-ROB 290 is a matter of design choice.

As mentioned, reservation station 420-1 controls the operand movement among a dedicated operand stack 410-1, the shared local variable registers 295 (LV-Reg), load buffer 270, store buffer 275, and a functional unit 430-1 (of a pool of functional units 430). Operands for the instructions may be loaded from or stored in any one of several locations. For example, operands may be stored in a corresponding operand stack 410-1, shared local variable register 295, run-time dependency detector 265, and/or load buffer 270, store buffer 275. The reservation station 420-1 retrieves the operands from any of these source locations and dispatches them to the functional unit 430-1 or to the operand stack 410-1 for instructions that push data onto or pop data from the operand stack 410-1. It should be noted that although (shared bus) interconnect 260 supports interconnectivity of functional modules, each execution unit 195 may include dedicated electronic signal paths amongst each other depending on the application. In a similar vein, the functional blocks associated with execution unit 195 may vary depending on the application.

Each operand stack 410-1 can be implemented as a register stack cache, similar to a picoJava processor. This configuration enables parallel access of stack operands for folded Java instructions.

As mentioned, each bytecode-trace may perform run-time local variable WRITEs with the per-trace local variable reorder buffer (LV-ROB) 290. Reads of the shared local variable register may be passed through to the LV-ROB 290 to ensure retrieval of proper data. For example, consider that an elder trace (e.g., a trace that would normally be executed later in a sequence of traces) may erroneously read a data value before a write modification by a younger trace (e.g., a trace that would normally be executed first in a sequence of traces) because the traces are executed in parallel. Such a condition would not occur if the traces were executed according to the original program ordering using a single operand stack. For example, in an application supporting non-parallel execution of in-line code, the younger trace would normally modify contents of, e.g., data X stored in memory. Thereafter, the elder trace would use the properly modified data X value. According to an embodiment of the invention, when the elder and younger traces are executed in parallel, the elder trace may read data X value before the younger trace has a chance to properly modify the data X value. This results in a run-time error necessitating rescheduling of traces and deletion of temporarily stored computational results.

As mentioned, run-time dependency detector 265 includes a load buffer 270, a store buffer 275, address compare circuits 450, and trace squash module 440 to detect and handle run-time errors. Typically, a trace id (e.g., an identifier of a trace) is stored along with the data in each entry of the load buffer 270 and store buffer 275. The trace-ids uniquely specify the program order. For example, the larger the trace id, the later the trace appears in the basic block. Speculative stores (from traces that are executing out of program order) are written to the store buffer 275. A speculatively executed load involves retrieving a data value from the store buffer 275 if there is an entry in the buffer corresponding to a store from this or an earlier trace to this address location. In other words, if a trace in a set of parallel executed traces attempts to retrieve data value X (e.g., a value stored at a particular memory address) from data cache 280, run-time dependency detector 265 first checks whether another trace has already retrieved data value X. If not, data value X is retrieved from data cache 280 to service the memory access request. If so, a temporary data value X is stored in the store buffer 275 is used instead to service the memory access request. Consequently, subsequent traces retrieving data value X will use the value stored in store buffer 275 instead of that in data cache 280 to service the memory access request. Modifications to values stored in data cache 280 (e.g., storing temporary data value X overwriting the old value) are done after traces have completed and no run-time dependency occurred.

Figure 6:
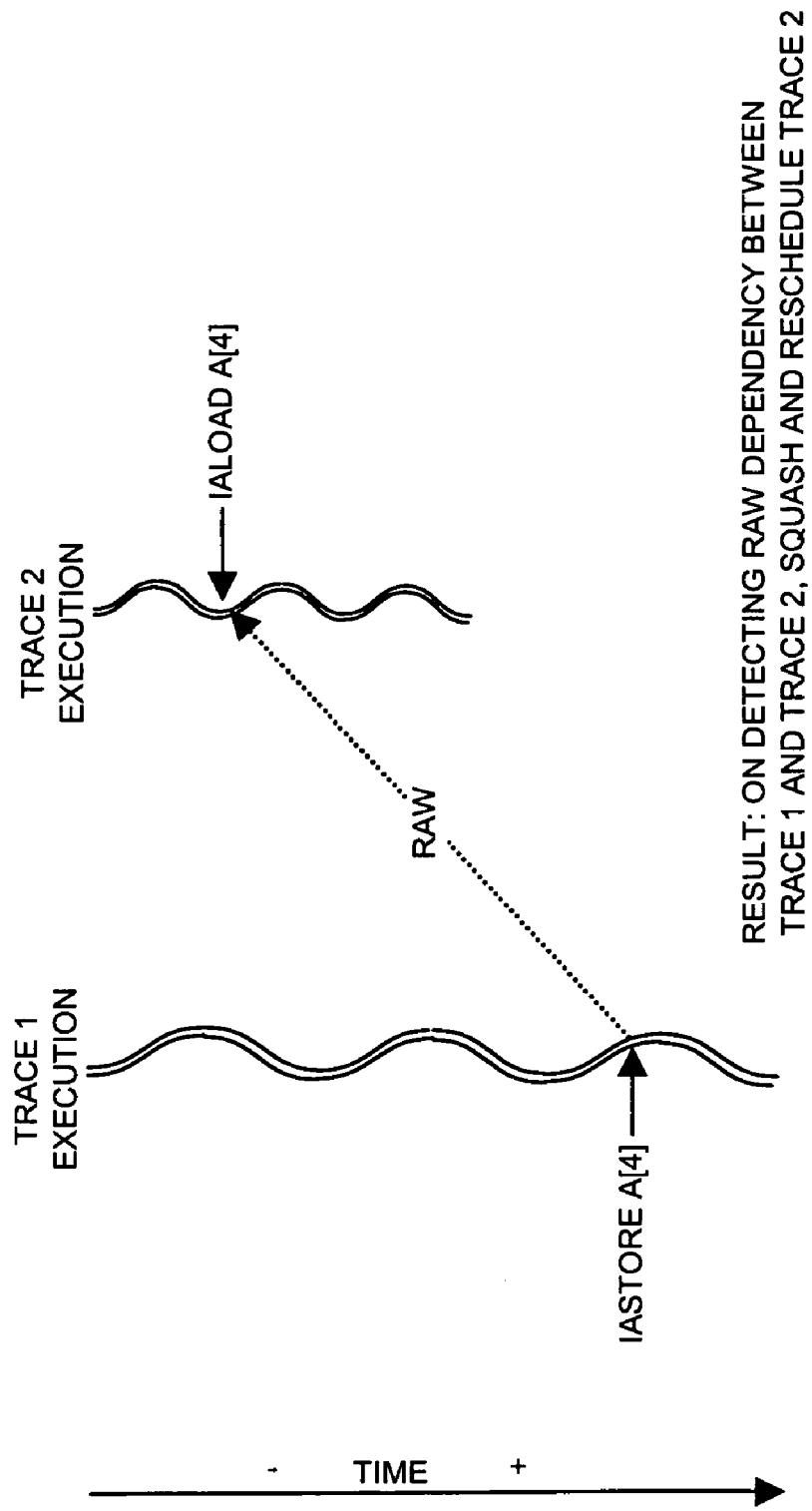
FIG. 6 is a graph illustrating execution of multiple traces in parallel and detection of a Read-After-Write condition according to an embodiment of the invention.
Figure 7:
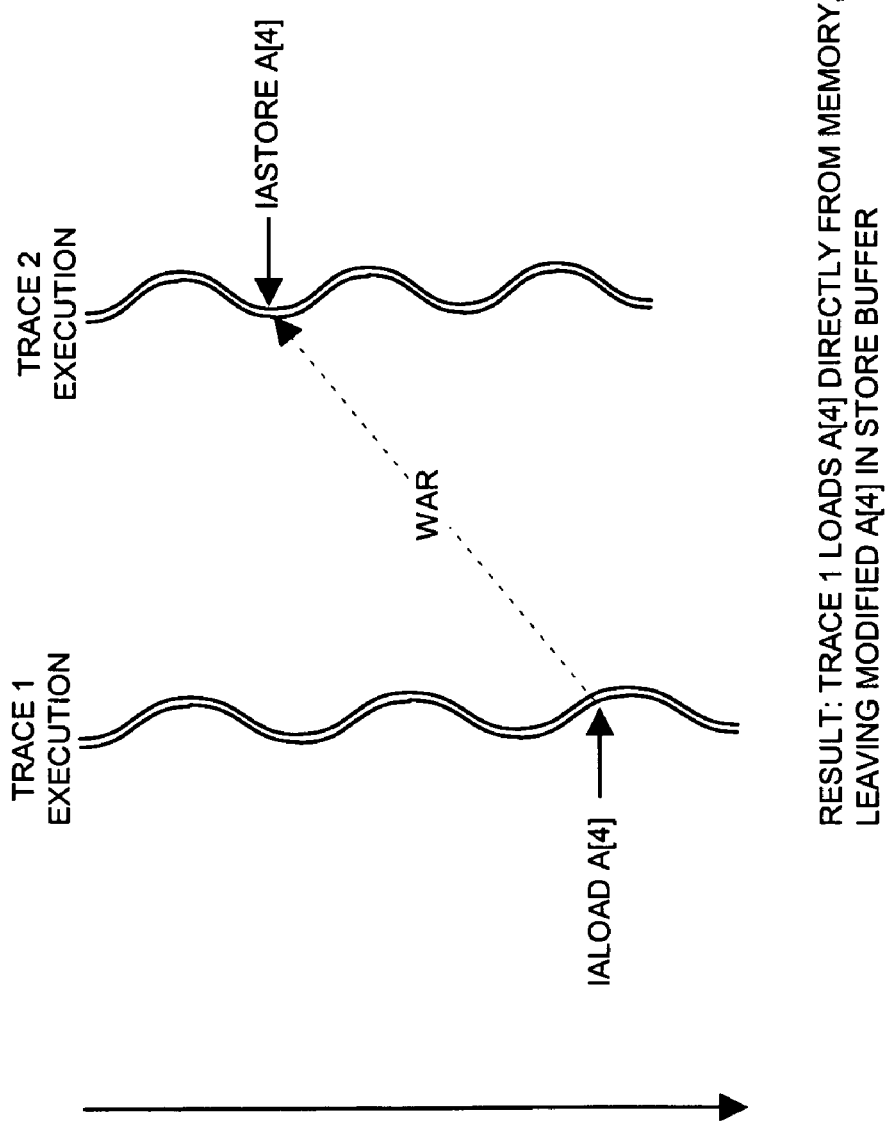
FIG. 7 is a graph illustrating execution of multiple traces in parallel and detection of a Write-After-Read condition according to an embodiment of the invention.
Figure 8:
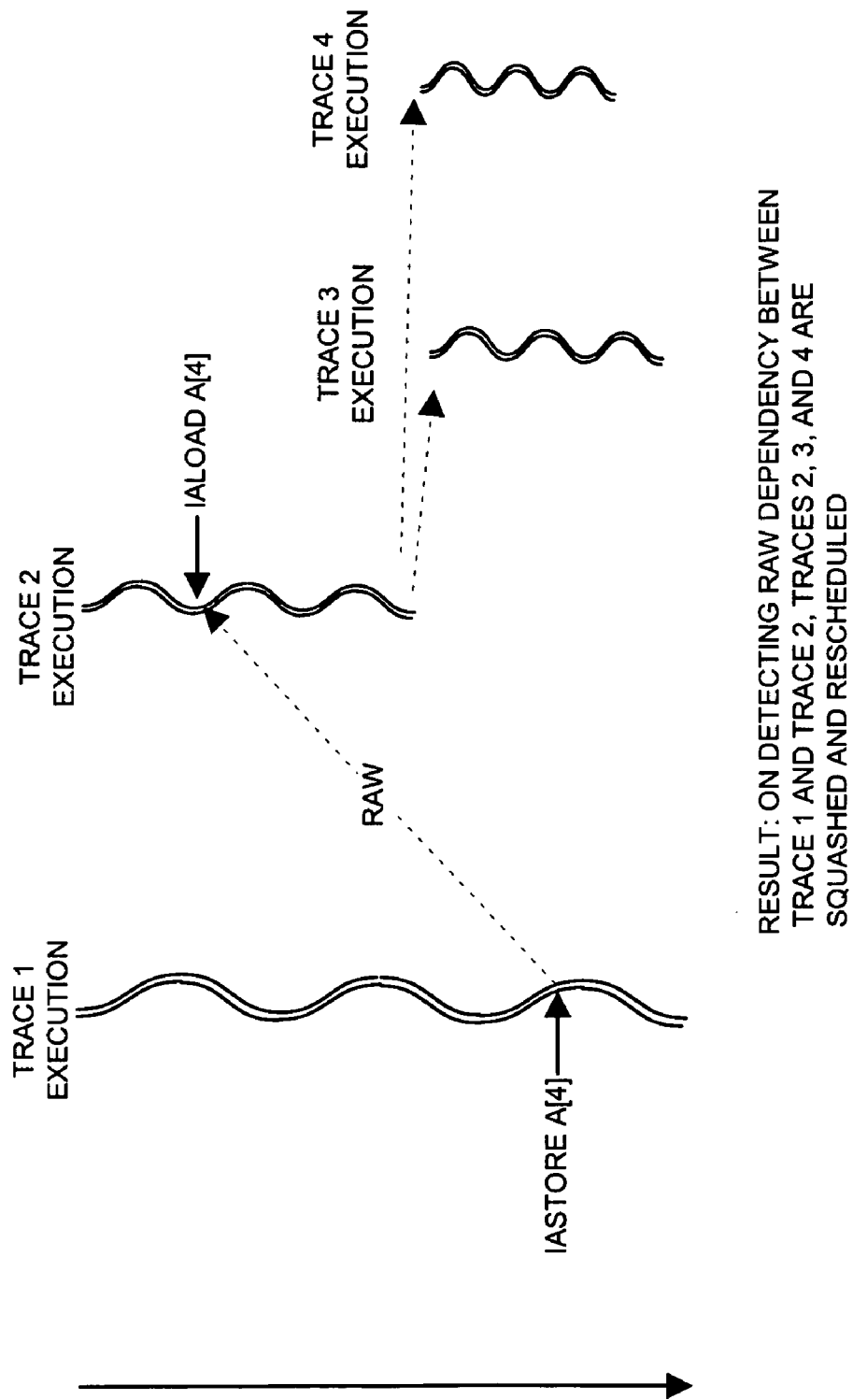
FIG. 8 is a graph illustrating execution of multiple traces in parallel and detection of a Read-After-Write condition according to an embodiment of the invention.

Example of trace dependencies detected at run-time are illustrated in FIGS. 6, 7 and 8. FIG. 6 is a diagram illustrating execution of trace 1 and trace 2 in parallel over time. In this example, trace 1 execution includes a write instruction (e.g., IASTORE A[4] to store a value of A[4] contents into a corresponding memory location). The write instruction occurs after executing read instruction (e.g., IALOAD A[4] loads a value of contents of A[4] into an operand stack 430-1) in trace 2. When executed in parallel according to an embodiment of the invention, a run-time dependency error occurs because trace 2 utilizes contents of A[4] before trace 1 has a chance to properly modify the contents of A[4]. In other words, execution of IALOAD A[4] in trace 2 should not occur until after IASTORE A[4] in trace 1. Run-time dependency detector 265 identifies this RAW condition between trace 1 and trace 2, causing trace 2 to be squashed and rescheduled for execution. For example, on detecting the RAW condition, trace squash circuit 440 generates a signal to the corresponding execution unit 195 to stop execution of trace 2. Also, run-time dependency detector 265 generates a notification to scheduler 130 that trace 2 needs to be rescheduled for later execution. Speculative computational results temporarily stored in store buffer 275 associated with trace 2 are deleted.

FIG. 7 is a diagram illustrating execution of trace 1 and trace 2 in parallel over time. In this example, trace 1 execution includes a read instruction (e.g., IALOAD A[4] loads a value of A[4] contents into a corresponding operand stack 410-1). This read instruction occurs after executing write instruction (e.g., IASTORE A[4] stores a value of A[4] into memory) in trace 2. Recall that according to conventional techniques, in-line program code results in execution of trace 1 before trace 2. Thus, in this instance, trace 2 would not have a chance to modify the contents of memory location A[4] and effect trace 1 execution. When executed in parallel according to an embodiment of the invention, a run-time dependency condition may occur because trace 2 modifies the contents of A[4] before it is read by IALOAD A[4] in trace 1. However, run-time dependency detector 265 may avoid potential data corruption by causing execution of trace 1 to load a value A[4] directly from memory (e.g., data cache 280), leaving modified A[4] contents associated with trace 2 in the store buffer 275. After traces 1 and 2 have completed without detection of run-time errors, the data store buffer is transferred to data cache 280.

FIG. 8 is a diagram illustrating execution of trace 1, trace 2, trace 3, and trace 4 in parallel over time. In this example, trace 1 execution includes a write instruction (e.g., IASTORE A[4] to store a value of A[4] contents into a corresponding memory location) similar in some respects to that shown in FIG. 6. The write instruction occurs after executing read instruction (e.g., IALOAD A[4] loads a value of contents of A[4] into an operand stack 430-1) in trace 2. When executed in parallel according to an embodiment of the invention, a run-time dependency error occurs because trace 2 utilizes contents of A[4] before trace 1 has a chance to properly modify the contents of A[4]. In other words, execution of IALOAD A[4] in trace 2 should not occur until after IASTORE A[4] in trace 1. Dependency detector 265 identifies this RAW condition between trace 1 and trace 2, causing trace 2, 3 and 4 to be squashed and rescheduled for execution. Traces 3 and 4 are squashed because they depend from trace 2. For example, as shown, traces 3 and 4 should not begin execution until after trace 2 has completed execution. Thus, squashing trace 2 results in a need to reschedule dependent traces 3 and 4. Also, it should be noted that any speculative computational results temporarily stored in store buffer 275 associated with traces 2, 3, and 4 are deleted.

Referring again to FIG. 4, when a load or store is executed by an execution unit 195, run-time dependency detector 265 performs the following routine: (i) a search is performed in the load buffer 270 and store buffer 275 to check whether another trace running out-of-order (with a greater trace id) has issued a memory write (ii) if so, the dependency type (RAW, WAR, or WAW) is determined by comparing the trace-ids and checking the operation type (iii) if the dependency is a WAR, the current trace fetches the data from the data cache 280, ignoring the value in the load buffer 270 and store buffer 275 that has been modified by the latter traces (e.g., see FIG. 6 illustrating this condition) iv) if the dependency is a WAW, the current trace makes a separate entry in the store buffer 275. Multiple store buffer entries with the same address, by different trace ids, will not introduce an inconsistency, since (at trace commit time when final results are stored in data cache 280) only the entry store made by a highest trace id (e.g., latter trace) will be stored in the data cache 280. (v) If the dependency is a RAW (which is a true dependency) the latter traces and their dependent traces are squashed and rescheduled (see FIG. 8).

Run-time dependency detection unit 265 supports the following routine to squash a trace. First, all the entries of the victim trace(s) in the LV-ROB 290 are deleted. Second, all entries in the load buffer 270 and store buffer 275 made by the victim trace(s) are invalidated. Third, the operand stack 410-1 assigned for the victim trace(s) being squashed are cleared. Finally, trace squash circuit generates a signal to trace scheduler 130 indicating the victim traces that need to be rescheduled.

In the event that a trace is not squashed as a result of detecting a run-time dependency, the temporarily buffered results stored in load buffer 270 and store buffer 275 are stored in data cache 280, shared local variable register 295, or per trace local variable reorder buffer 290. More specifically, when the last instruction of a trace that is executing in the program order (non-speculative trace) completes its execution, the local variables modified by the trace from LV-ROB 290 are written to LV-Regs 295 and the trace is said to be committed. At the same time, the trace's "committed value" (or temporary results) in the load buffer 270 and store buffer 275 are flushed (e.g., stored) to the data cache 280.

Further details of trace processor 100 according to embodiments of the invention will be described with respect to flow charts in the block diagram illustrated in FIGS. 9-15. During the discussion of processing steps within the flow charts that follow, specific examples will be provided with respect to identification of traces 147 using example Java software code and with respect to identification of example dependencies between those traces 147 in order to assist in describing and understanding embodiments of the invention. It is to be understood that these examples are not intended to be limiting of embodiments of the invention, nor is the architecture of the trace processor 100 illustrated in FIG. 1 intended to be limiting to other embodiments of the invention.

Figure 9:
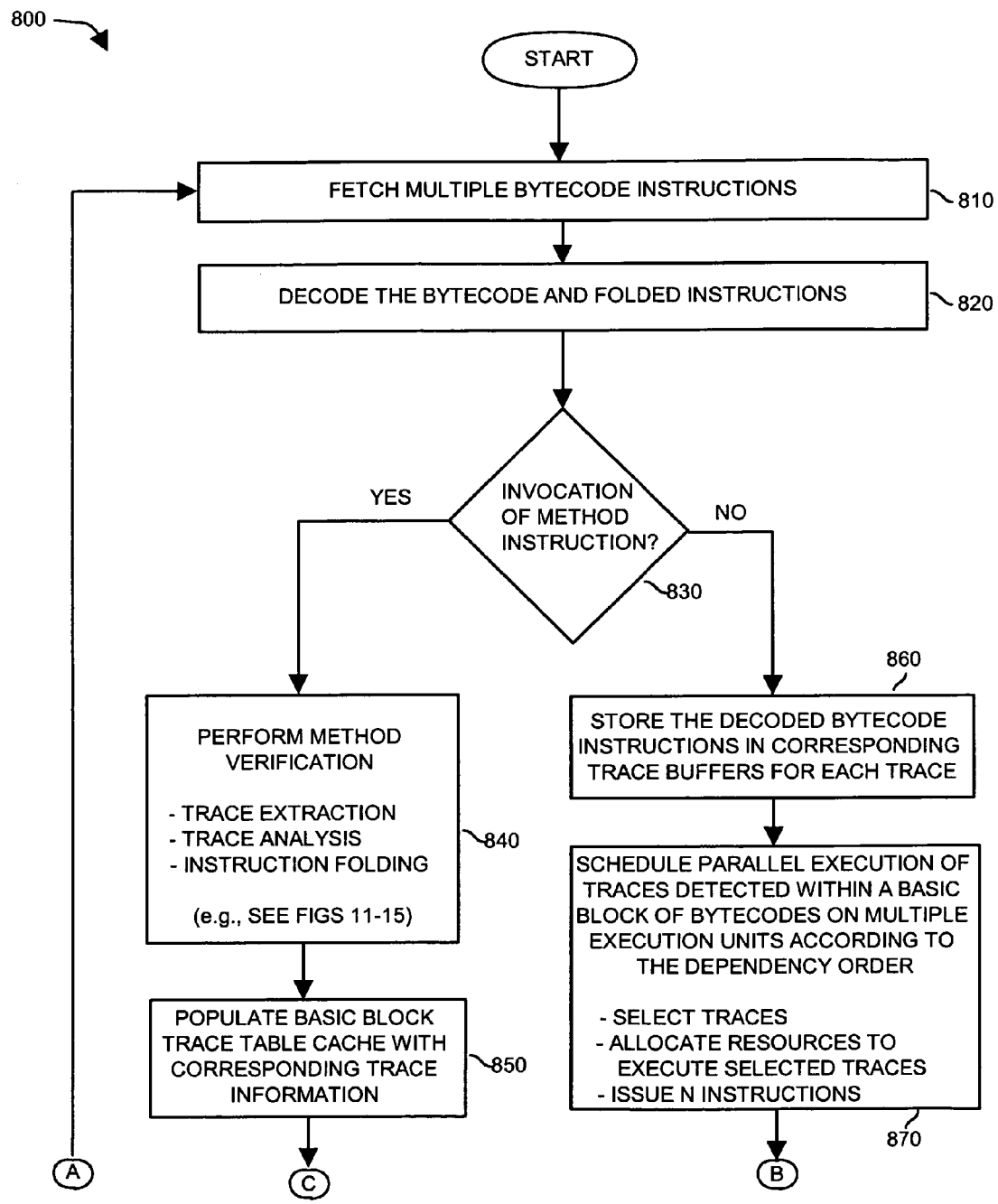
FIGS. 9 and 10 combine to form a flowchart of processing steps associated with execution of multiple traces in parallel in accordance with an example embodiment of the invention.
Figure 10:
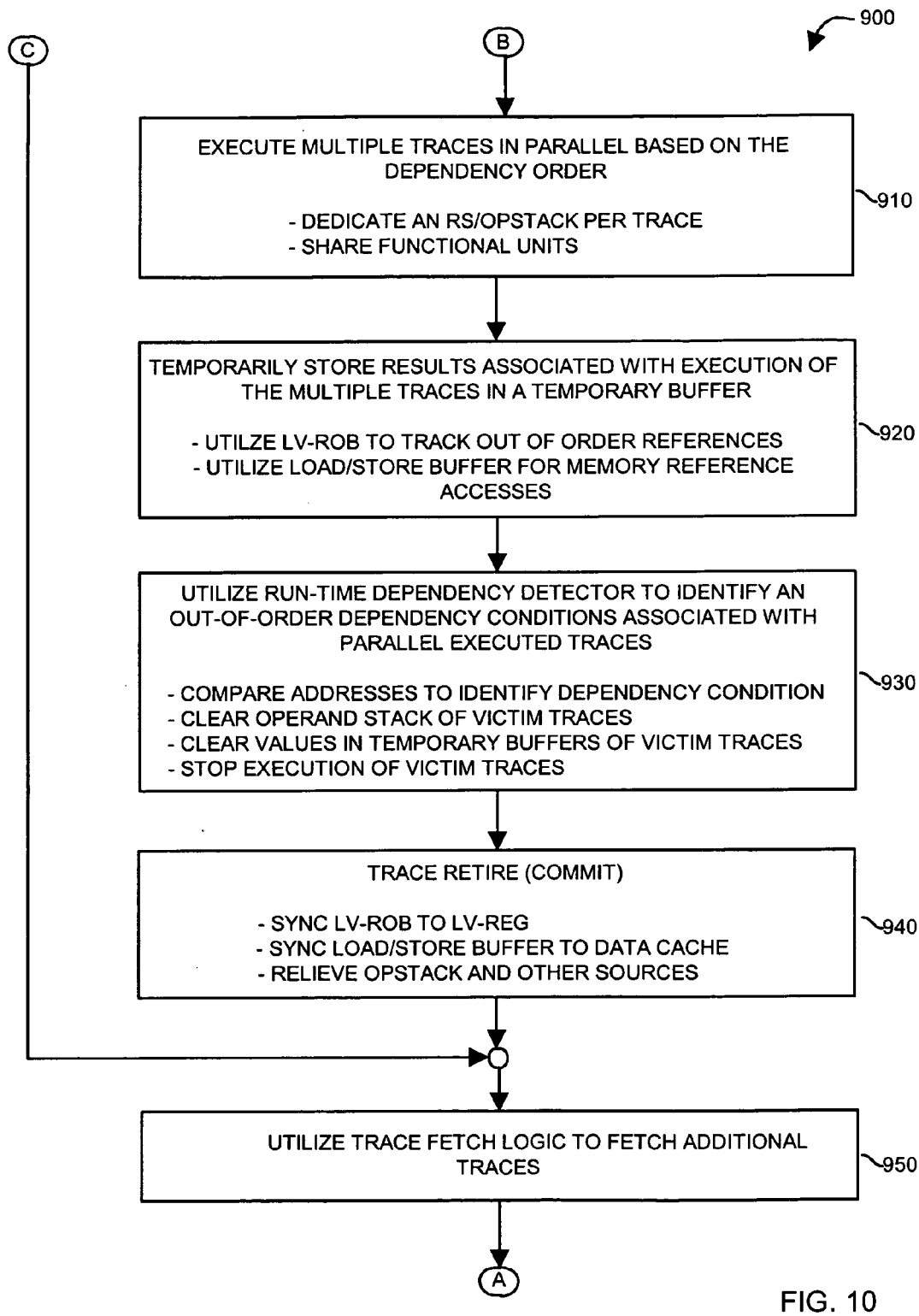

FIGS. 9 and 10 combine to illustrate an overall flowchart associated with trace processor 100 (in FIG. 2) according to embodiments of the invention.

As shown in flowchart 800 (of FIG. 9), in step 810, instruction fetch controller 220 fetches multiple bytecode instructions from method cache 225.

In step 820, decoder 230 decodes the bytecodes and folded instructions. For example, decoder 230 identifies folded bytecode-instructions, identifies bytecode instructions classes, identifies the input/output register location for a command, etc.

In step 830, the invocation of a method instruction causes flow to continue in step 840.

In step 840, method verification logic 235 performs the method verification function including trace extraction, trace dependency analysis and instruction folding. As mentioned, this may be performed in hardware, software or a combination of both. Trace detector 110 identifies traces in a segment of code including successive bytecode instructions, each of the multiple identified traces in the segment of code including a set of bytecode instructions capable of being executed on an execution unit 195. Prior to execution of multiple identified traces in corresponding execution units 195, dependency detector analyzes the traces in the segment of code 142 to determine a dependency order for executing the traces. The dependency order identifies at least one of the traces associated with the segment of code 142 that cannot be properly executed in parallel with another trace associated with the segment of code 142. In step 850, method verification logic 235 populates basic block trace table cache 215 with corresponding trace information. As shown, flow after step 850 continues in step 950 in FIG. 10. This will be discussed later in the specification.

Referring again to FIG. 9, the failure of detecting an invocation instruction in step 830 prompts flow to step 860. In step 860, multiplexer 240 stores the decoded bytecode instructions associated with the multiple decoded instructions in corresponding trace buffers 310, 320, and 330 for each trace.

In step 870, trace scheduler 130 schedules parallel execution of traces detected within a basic block of bytecodes on multiple execution units 195 according to the dependency order stored in basic block trace table cache 215. For example, this involves identifying and selecting traces for execution, allocating resources to execute the selected traces, and issuing multiple bytecode instructions for execution.

After step 870, flow continues at step 910 as shown in FIG. 10. As shown in step 910, execution units 195 execute multiple traces in parallel based on the dependency order. This includes dedicating a reservation station 420 and corresponding operand stack 410 to execute each trace. In one embodiment, functional units 430 are shared among different execution units to reduce an amount of required hardware to execute the traces.

In step 920, execution units 195 temporarily store results associated with execution of the multiple traces in the store buffer 275 and load buffer 270, and LV-ROB 290. As previously discussed, the temporary buffer serves as a scratchpad area for storing computational results associated with the traces until after it is known that no run-time errors occurred during execution. For example, LV_ROB is used to store out of order references. Load buffer 270 and store buffer 275 are used for memory reference accesses.

In step 930, at run-time, dependency detector 265 identifies any out-of-order memory dependency condition associated with parallel executed traces resulting in an error. As previously discussed, this involves comparing READ and WRITE addresses (via address compare module 450) to identify occurrence of a run-time dependency condition (see FIGS. 6-8). In response to detecting an out-of-order memory condition: i) trace squash module 440 squashes execution of latter traces (victim traces) associated with the segment of code that depend on results from earlier traces, ii) clears results in the temporary buffer (e.g., store buffer 275 and load buffer 270 and LV-ROB) associated with the squashed traces, iii) clears operand stacks of victim traces, and iv) generates a signal to trace scheduler 130 to reschedule victim traces that are squashed.

In step 940, traces that are not victim to a run-time dependency condition are retired. For example, LV-ROB 290 and LV-Reg 295 are synchronized. Additionally, load/store buffers 270, 275 and data cache 280 are synchronized. Any allocated resources for complete traces are then de-allocated for use by other traces.

In step 950, bytecode trace fetch logic 210 fetches additional traces and flow thereafter continues in step 810 of FIG. 9.

FIGS. 11-15 are a flowcharts illustrating example processing operations performed according to embodiments of the invention to support execution of instructions in parallel for a software program, hardware instantiation or combination thereof. Generally, the processing operations illustrated in the flowchart in FIGS. 11-15 are performed by method verification logic 235 shown, for example, by the architecture illustrated in FIGS. 1 and 2 discussed above.

Figure 11:
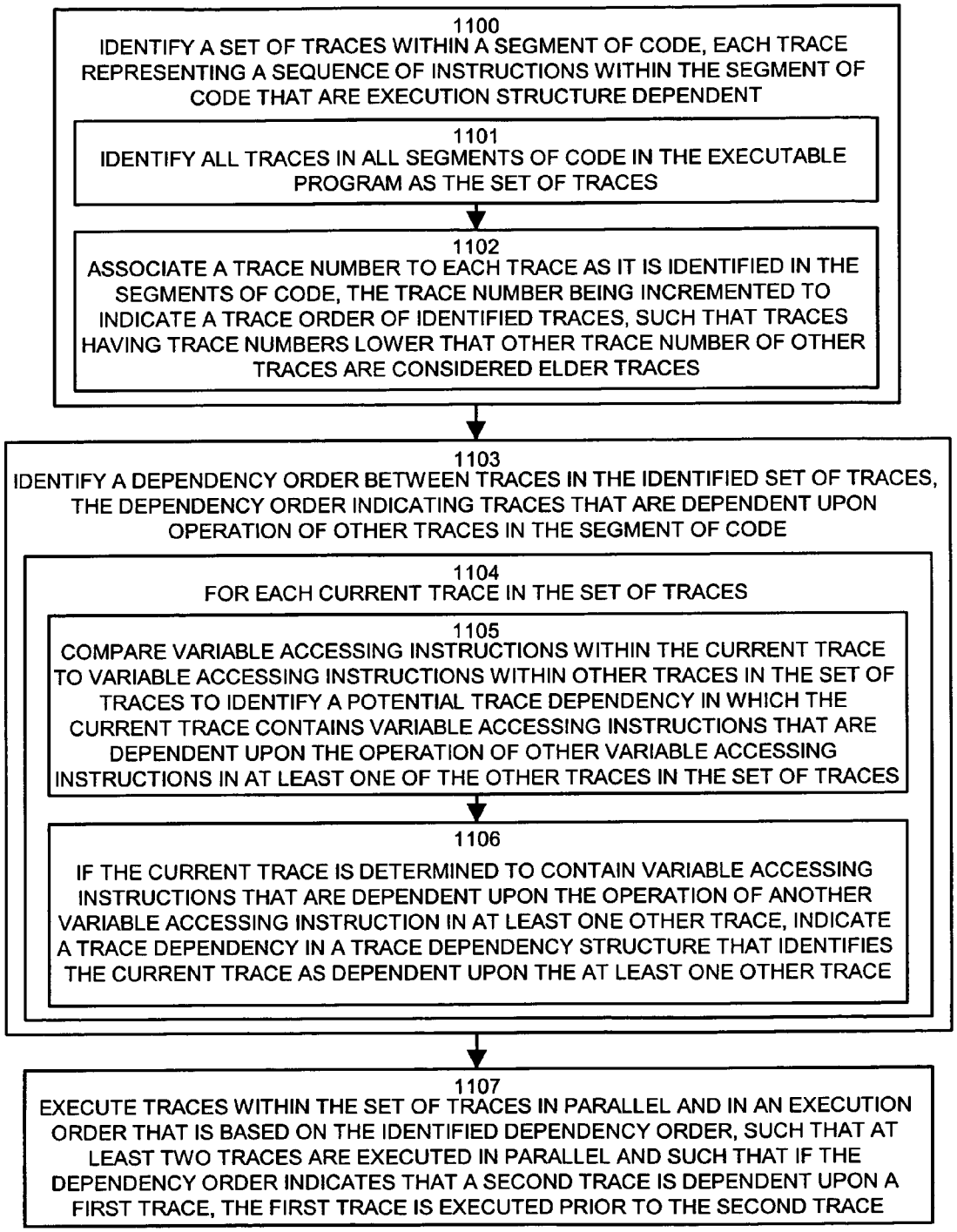
FIG. 11 is a flowchart of processing steps to the trace processor performs according to high-level operations of embodiments of the invention.

In step 1100 of FIG. 11, the trace processor 100 generally operates the trace detector 110 to identify a set of traces 145 within a segment of code 142. Each trace 147 represents a sequence of instructions such as Java bytecode within the segment of code 142 that are execution structure dependent upon each other and that are execution structure independent from other series of instructions represented by other traces 147.

As shown in sub-step 1101, the trace detector 110 can identify all traces in all segments of code 142-1 through 142-N in the executable program 141 as the set of traces 145.

As shown in sub-step 1102, the trace detector 110 can associate a trace number to each trace as it is identified in the segments of code 142 (e.g., traces T1-1, T2-1 ... T2-1, T1-2, T2-2, ... and so forth). The trace number is incremented to indicate a trace order of identified traces 147. Traces having trace numbers lower than other trace numbers are younger traces. Trace order will be important and will be explained in detail when discussing detection of data dependencies between traces 147.

Prior to the completion of discussion of steps 1103 through 1107 in the flow chart in FIG. 11, an example of a sample trace identification process as applied to a hypothetical segment of code will now be provided along with a discussion of details of processing operations performed according to certain embodiments of the invention to identify traces 147 within segments of code 142. In other words, prior to discussing steps 1103 through 1107 in FIG. 11, details of processing operations associated with step 1100 as performed by the trace detector 110 operating within trace processor 100 in FIG. 1 will now be explained.

Assume for this example that the trace processor 100 is a stack-based Java machine (e.g., a JVM or a Java processor) that can perform or execute traces 147 of Java instructions in parallel with each other to speed-up overall execution of the Java program 141. During typical execution or performance of Java bytecode instructions, all the operands are moved on top of an execution structure, which in this example is an operand stack, before they are executed. During the processing of the bytecodes, the operand stack execution structure therefore grows and shrinks. When there are no operands in the operand stack execution structure, it is said to be "clean", which is referred to herein as a "clean condition" of the operand stack 410. A sequence of bytecode instructions that lie or exist between execution structure clean points is a bytecode trace or simply a trace 147. There is operand stack execution structure dependency between the bytecodes of a trace 147 since the stack is unclean within a trace 147, but a trace 147 is operand stack execution structure independent from other traces 147 in the set of traces 145, since each trace is separated from former and subsequent traces by an operand stack clean point. Embodiments of the invention recognize this situation and provide flexibility to schedule multiple traces 147 for parallel execution within different operand stack execution structures 197 in each execution unit 195. Thus, a bytecode trace 147 could be defined as the sequence of Java bytecodes, which are operand stack-independent from the rest of the bytecodes of a basic block or of a thread. An example that follows will illustrate this concept of embodiments of the invention further.

The following example segment of Java software code is taken from a program called "compress" that exists within a SPECjvm'98 benchmark:

```
public void compress( ) {
    int fcode;
    int i = 0;
    int c;
    int ent;
    int disp;
    int hsize_reg;
    int hshift;
    <skip>
    while ( (c = Input.getbyte( )) != –1) {
        in_count++;
        fcode =(((int) c << maxbits)+ ent);
        /* xor hashing */
        i = ((c << hshift) ^ ent)
        int temphtab = htab.of (i);
        if ( htab.of (i) == fcode ) }
        . . .
    }
}
```

Upon compiling the above Java code example, a Java compiler produces a series of Java bytecode instructions. If those Java bytecode instructions were executed within a single-operand stack execution structure Java virtual machine, the operand stack execution structure would grow in shrink as required. The following table illustrates the Java bytecode instructions (produced a result of compiling the above example of Java code) and their corresponding program counter (PC) locations, the contents of the operand stack execution structure as is exists during simulated execution of those instructions, the beginning and ending of six respective traces 147 that the trace detector 110 identifies within the Java bytecode, as well as the Java code equivalent instruction from the code example above:

TABLE ILLUSTRATING TRACE IDENTIFICATION

| PC:Java bytecode | Operand stack Execution struct. contents and (Stack Depth) | Traces identified including beginning and end of each trace | Java Code Equivalent |
|---|---|---|---|
| 72:aload_0 | SP (1) | Trace 1 begin | in_count ++ |
| 73:dup | SP+ = 1 (2) | | |
| 74:getfield #31 | SP– = 1, SP+ = 1 (2) | | |
| 77:iconst_1 | SP+ = 1 (3) | | |
| 78:iadd | SP– = 2, SP+ = 1 (2) | | |
| 79:putfield #31 | SP– = 2 (0) | Trace 1 end | |
| 82:iload_3 | SP (1) | Trace 2 begin | fcode = |
| 83:aload_0 | SP+ = 1 (2) | | (((int) c << maxbits) + |
| 84:getfield #34 | SP– = 1, SP+ = 1 (2) | | ent); |
| 87:ishl | SP– = 2, SP+ = 1 (1) | | |
| 88:iload #4 | SP+ = 1 (2) | | |
| 90:iadd | SP– = 2, SP+ = 1 (1) | | |
| 91:istore_1 | SP– = 1 (0) | Trace 2 end | |
| 92:iload_3 | SP (1) | Trace 3 begin | i = |
| 93:iload #7 | SP+ = 1 (2) | | ((c << hshift) ^ ent); |
| 95:ishl | SP– = 2, SP+ = 1 (1) | | |
| 96:iload #4 | SP+ = 1 (2) | | |
| 98:ixor | SP– = 2, SP+ = 1 (1) | | |
| 99:istore_2 | SP– = 1 (0) | Trace 3 end | |
| 100:aload_0 | SP (1) | Trace 4 begin | htab (loaded into a |
| 101:getfield #30 | SP– = 1, SP+ = 1 (1) | | local variable reg.) |
| 104:astore #8 | SP– = 1 (0) | Trace 4 end | |
| 106:aload #8 | SP (1) | Trace 5 begin | temphtab = htab.of (I) |
| 108:getfield #47 | SP– = 1, SP+ – 1 (1) | | |
| 111:iload_2 | SP+ = 1 (2) | | |
| 112:iaload | SP– = 2, SP+ = 1 (1) | | |
| 113:istore #8 | SP– = 1 (0) | Trace 5 end | |
| 115:iload #8 | SP (1) | Trace 6 begin | if (temphtab == fcode) |
| 117:iload_1 | SP+ = 1 (2) | | |
| 118:if_icmpne 134 | SP– = 2 (0) | Trace 6 end | |

According to embodiments of the invention, the trace detector 110 parses, analyzes, or otherwise simulates execution (e.g., and thus determines stack operations) of the above Java bytecode to identify six different trace constructions from as shown in the above table, with identifying stack clean points and stack-depth calculations for every instruction. Initially, the first stack clean point is identified and the PC is marked, which is the start PC of the first trace. As each bytecode is encountered, the trace detector simulates its execution and stack growth or shrink is calculated. At the detection of another stack clean point, the trace detector again marks the PC location of the most recently simulated instruction, which is the end PC of a trace. The above procedure is repeated until all the traces are identified in a basic block.

In the trace examples shown above, the bytecode, which moves the operand(s) in to the clean operand stack 410 becomes the first bytecode of a trace. The bytecode, which moves out the operand(s) to make the operand stack 410 clean again is the last bytecode of a trace. The Java bytecode "iinc" instruction is a special Java instruction that does not operate on top of the operand stack 410 but instead operates on the local variable itself. In the case of this instruction, the operand from the local variable is moved to the adder unit to perform an increment operation and a result is placed back to the same local variable slot in the local variable stack. Thus the "iinc" instruction is opstack-independent and therefore is a trace by itself. By reviewing the above example, it can be seen how embodiments of the invention can identify traces based on operand stack clean locations or clean conditions.

Figure 12:
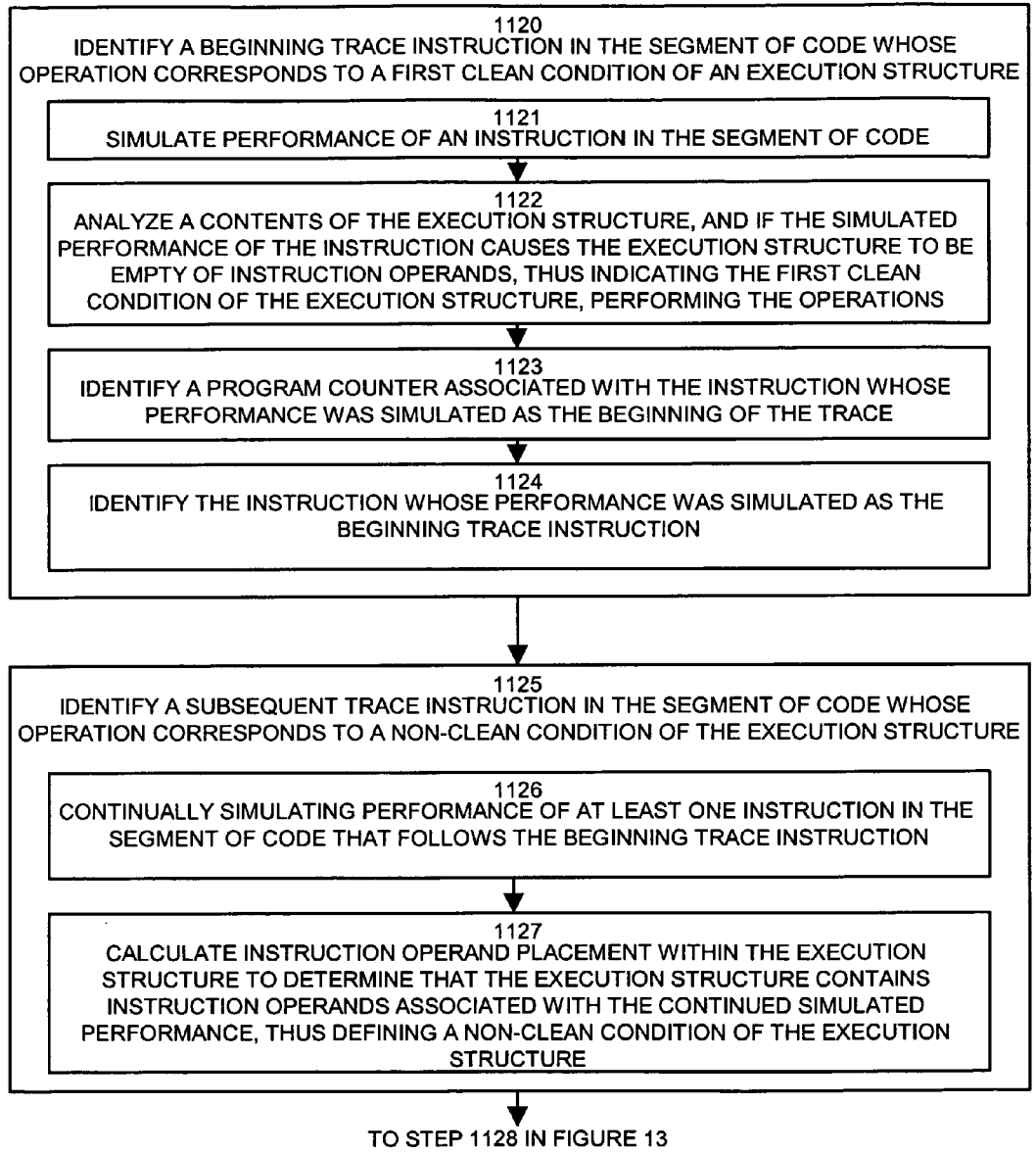
FIGS. 12 and 13 are a flowchart of processing steps to identify a set of traces within a segment of code in accordance with one example embodiment of the invention.
Figure 13:
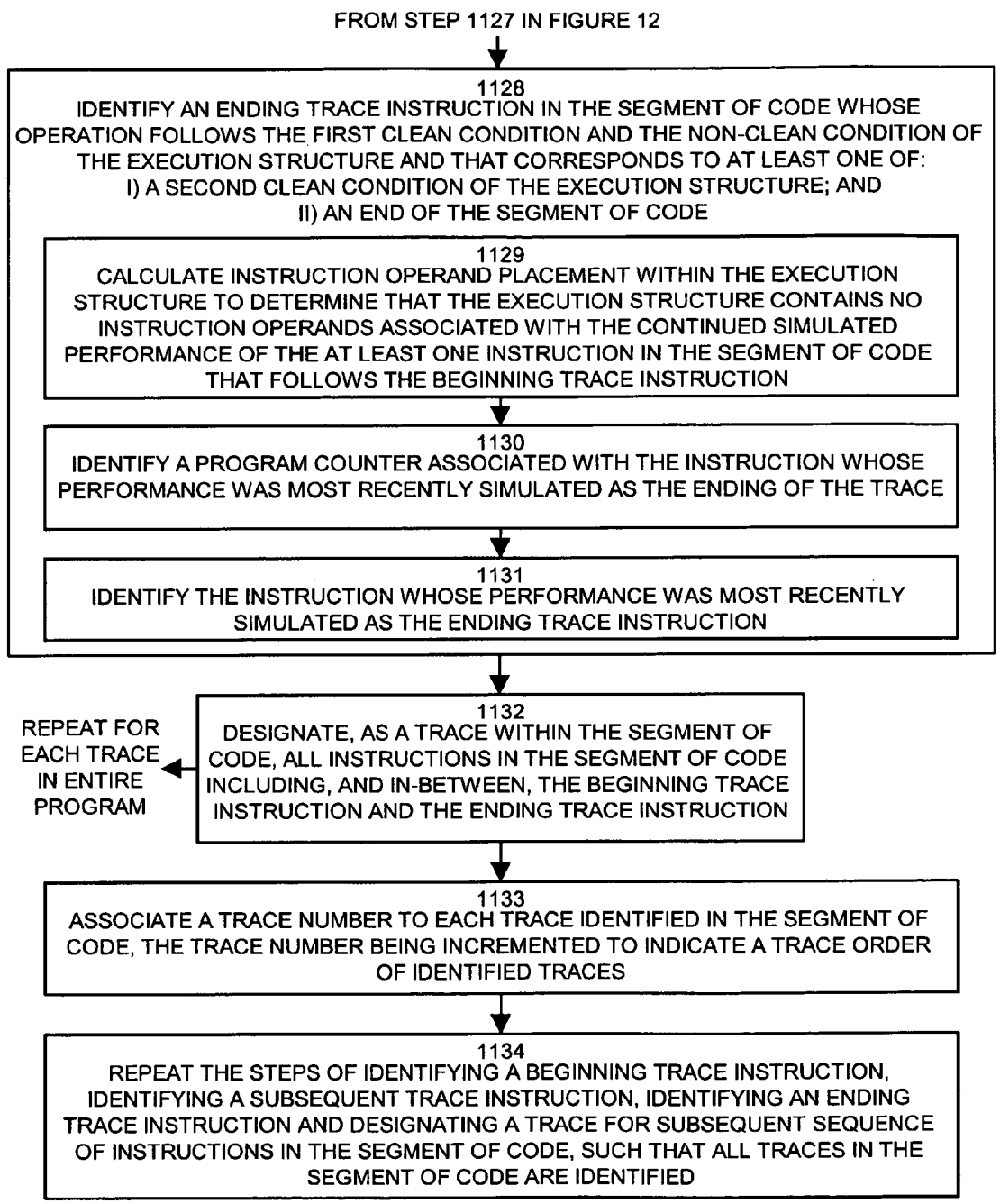

FIGS. 12 and 13 are a flowchart of processing steps that illustrate processing operations performed according to one example embodiment of the invention by (or within) an event detector 110 in a trace processor 100 to identify a set of traces 145 within a segment of code 142 in a program 141.

In step 1120, the trace detector 110 identifies a beginning trace instruction in the segment of code whose operation corresponds to a first clean condition of an execution structure.

To perform step 1120, in sub-step 1121 the trace detector 110 simulates performance of an instruction in the segment of code. By simulating performance, what is meant is that the trace detector 110 can use knowledge of how instructions in the segment of code would effect the operand stack 410 such as a stack if they were to be executed at runtime. It is to be understood that simulated performance of an instruction does not require that the instruction be fully executed but rather, involves the trace detector 110 being able to determine what the contents of the execution structure such as a stack would be if a particular instruction were to execute.

During simulated performance, in step 1120 to the trace detector 110 can analyze the contents of the execution structure such as the operand stack. If just prior to the simulated performance of the instruction, the execution structure is empty of instruction operands, this indicates the first clean condition of the execution structure and the trace detector 110 performs the operations of substance 1123 and 1124.

In step 1123, the trace detector 110 identifies a program counter (PC) associated with the instruction whose performance is to be simulated as the beginning of the trace 147.

In step 1124 the trace detector 110 identifies the instruction whose performance is to be simulated as the beginning trace instruction.

Next, in step 1125 the trace detector 110 identifies a subsequent trace instruction in the segment of code whose operation corresponds to a non-clean condition of the execution structure.

To do so, as shown in sub-step 1126 the trace detector 110 "continually" simulates performance of at least one instruction in the segment of code 142 that follows the beginning trace instruction.

In step 1127, as a check after simulated performance of each instruction in the segment of code that follows the beginning trace instruction, the trace detector 110 calculates instruction operand placement within the execution structure (e.g., within the stack) to determine that the operand stack 410 contains instruction operands associated with the continued simulated performance, thus defining a non-clean condition of the operand stack 410. Calculation of instruction operand placement came comprise tracking conditions and removals to and from the operand stack 410 to determine if it has returned to a clean point.

Next, in step 1128 the trace detector identifies an ending trace instruction in the segment of code 142 whose operation follows the first clean condition and the non-clean condition of the operand stack 410. The ending trace instruction corresponds to either a second clean condition of the execution structure for the segment of code (e.g., the end of a basic block or the end of the thread) or transfer of control to a new execution point that does not follow the current instruction. That is, the ending trace instruction is either the instruction whose simulated execution causes the operand stack 410 to return to the former clean condition or causes transfer of control out of the basic block or is otherwise the end of the segment of code 142.

In sub-step 1129, after simulated performance of one or more instructions in the segment of code that follows the beginning trace instruction, to identify the ending trace instruction the trace detector 110 calculates instruction operand placement within the operand stack 410 to determine that the operand stack 410 contains no instruction operands associated with the continued simulated performance of an instruction in the segment of code 142 that follows the beginning trace instruction. In other words, to detect the ending trace instruction that follows the beginning trace instruction, the trace detector 110 detects when the execution structure such as the stack is again empty or clean.

In addition, in sub-step 1130 the trace detector 110 identifies a program counter (PC) associated with the instruction whose performance was most recently simulated as the ending of the trace 147.

In step 1131 the trace detector 110 identifies the instruction whose performance was most recently simulated as the ending trace instruction.

Next, in step 1132 the trace detector 110 designates, as a trace 147 within the segment of code 142, all instructions in the segment of code including, and in-between, the beginning trace instruction and the ending trace instruction. By designating a trace, what is meant is that the trace detector 110 can specify all parameters associated with the trace including the beginning in ending of the trace as identified by the program counter of beginning in ending instructions associated with the trace, an identity of the thread or basic block in which this trace was identified, and any other information that may be relevant to the trace 147, such as the number of instructions in the trace or the like. Information concerning particular identified traces 147 may be stored, for example, within a single structure such as the trace dependency structure 150 or a basic block trace table which contains trace identification information as well as trace dependency information. That is, it is to be understood that the illustration FIG. 1 of the set of traces 145 being separately shown from the trace dependency structure 150 is provided for ease of understanding embodiments of the invention and is not meant to be limiting. In this manner, by simulating execution of the bytecode instructions in a segment of code 142, the trace detector 110 can identify all traces 147 within the segment of code 142.

Next, in step 1133 the trace detector 110 associates a trace number to each trace 147 identified in the segment of code 142. The trace number is incremented to indicate a trace order of identified traces and may be stored in a basic block trace table or other structure such as the trace dependency structure 150. As will be explained shortly, the trace dependency detector 120 can utilize numbering of traces during detection of data dependencies between traces 147 such that if a lower numbered trace contains variable references to a variable within a higher numbered trace, the higher numbered trace will be considered to be a dependent upon the lower numbered trace and will be scheduled for execution thereafter.

Finally, in step 1134 the trace detector 110 repeats the steps of identifying a beginning trace instruction, identifying a subsequent trace instruction, identifying an ending trace instruction and designating a trace for subsequent sequences of instructions in the segment of code 142 such that all traces in the segment of code are identified. This processing can be repeated for all segments of code within the program 141 in order to identify a complete set of traces 145.

In one embodiment of the invention, the operand stack 410 is a stack and the operation explained above of calculating instruction operand placement within the execution structure comprises calculating stack growth and/or stack shrinkage of instruction operands with the stack as a result of simulated execution of instructions. In such cases, the beginning trace instruction corresponds to an instruction for which simulated execution caused the stack to grow from the clean condition to the non-clean condition and the ending trace instruction corresponds to an instruction for which simulated execution caused the stack to grow from the non-clean condition to the clean condition. In this case, the trace defines a continuous sequence of instructions from the beginning trace instruction to the ending trace instruction during which simulated execution causes the stack to contain at least one operand associated with trace instructions whose execution was simulated.

It is noted that in there can be multiple traces within a segment of code 142 such as a basic block, and that a trace and the segment of code 142 (e.g., a basic block) could be the same, and in few rare cases, a trace 147 can extend beyond the end of a segment of code 142, such as by extending beyond the end of a basic block. As an example, if the end of a trace 147 in one segment of code 142-1 is not a control transfer instruction, then the trace 147 may end in any one of the next segments of code 142-2, 142-3 or the like (i.e., in another basic block), that each may be a primary or alternate basic block, depending on the path the execution control takes. When the trace continues beyond the end of a basic block, it is referred to as an unclean trace and the point of execution control after an instruction that end and unclean trace began the new trace which is also considered an unclean trace. Unclean traces can be illustrated in the following example:

Example of Un-clean traces

| Basic block#: trace# | Bytecode sequence | Comments |
|---|---|---|
| bb1: t1 | b1: iload x | |
| | b2: iload y | |
| | b3: ifeq b8 | bb1 ends; t1 ends incompletely |
| bb2: t2 | b4: iload y | next primary BB (of bb1) starts |
| | b5: idiv | |
| | b6: istore z | end of trace t1 (complete) |
| | b7: goto b11 | |
| bb3: t3 | b8: iconst_1 | next secondary BB (of bb1) starts |
| | b9: idiv | end of trace t1 (complete) |
| | b10: istore z | |

In the above example, if a control transfer takes place from instruction b3 to b8, then the incomplete trace t1 of basic block 1 and the incomplete trace t3 of the basic block 3 should be scheduled to execute on the same stack. A difficulty with such a trace is that operation stack dependency is imposed across the basic block. Embodiments of the invention handle this situation by splitting the trace into three traces, as shown in this example, and by marking each trace in the trace dependency structure 150 as non-clean or unclean-stack trace (in the "UNCL" column in FIG. 1, representing an Unclean Trace). It is then left to the trace scheduler 130 that schedules execution of bytecode traces to schedule each of these traces 1, 2 or 3 on the same operand stack execution structure. The bytecode-trace scheduling logic in the trace scheduler 130 schedules execution of such incomplete trace sequences on the same stack by recognizing their status as "unclean" in the UNCL column of the trace dependency structure 150. To this end, the trace scheduler 130 will schedule either [T1 and T3] or [T1 and T2] on the same operand stack 410. It is noted herein that from a review of Java bytecode in SPECjvm98 benchmark applications, almost all-basic blocks (more than 95%) start and end with a stack clean point. This implies that the only traces of a basic block that do not end with a stack clean point are those that extend beyond the basic block. Because there are not many of such traces in Java applications, they may be serialized and held to execution in the same operand stack execution structure (as opposed to being executed in parallel on different stacks) without much performance penalty.

Figure 14:
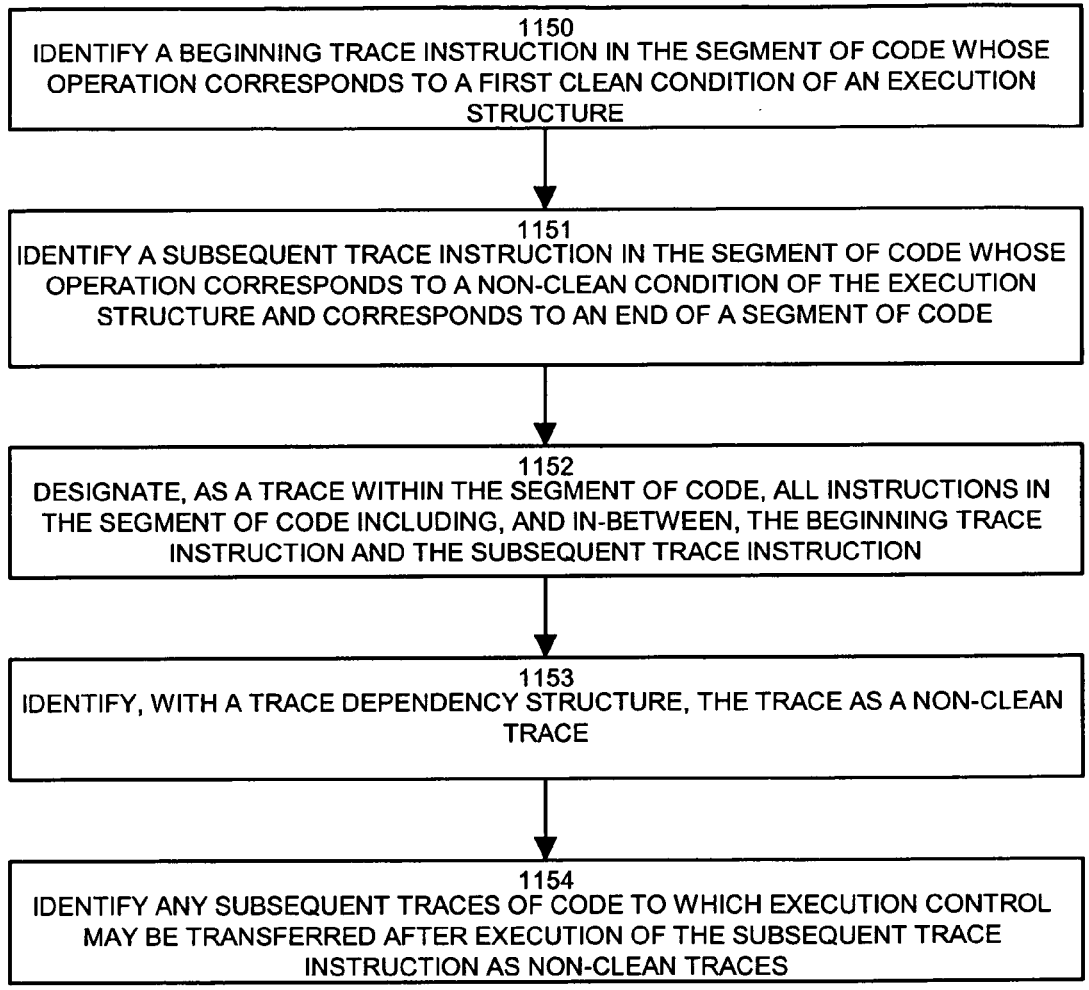
FIG. 14 is a flowchart of processing steps to detect unclean traces within segments of code in accordance with one example embodiment of the invention.

FIG. 14 is a flowchart of processing operations in accordance with one example embodiment of the invention in order to identify unclean traces 147 within a segment of code that are non-clean as explained in the above example.

In step 1150 the trace detector 110 identifies the beginning trace instruction in the segment of code 142 whose operation corresponds to a first clean condition of an operand stack 410 such as a stack.

Next, in step 1151 the trace detector 110 identifies a subsequent trace instruction in the segment of code whose operation corresponds to a non-clean condition of the execution structure and corresponds to an end of a segment of code. In other words, in step 1151, during simulated execution of instructions, the trace detector 110 encounters a trace instruction that corresponds to an end of a segment of code (i.e., either a branch point for the end of a basic block) and is thus a non-clean condition for that trace 147. The end of the segment of code is identified according to these example embodiments of the invention as either an end of a basic block, a transfer of control from the ending trace instruction to an instruction that does not immediately follow the ending trace instruction, or a transfer of control from the ending trace instruction of a first trace to a beginning trace instruction of a second trace.

Next, in response to detecting the non-clean condition, in step 1152 the trace detector 110 designates, as a trace 147 within the segment of code 142, all instructions in the segment of code 142 including, and in-between, the beginning trace instruction and the subsequent trace instruction that caused the non-clean condition. In other words, this non-clean trace 147 includes the beginning trace instruction and any simulated instructions up to and including the instruction that caused the occurrence of the non-clean condition.

Next, in step 1153 and trace detector 110 identifies, within the trace dependency structure 150, the trace 147 as a non-clean trace. This is illustrated in the example in FIG. 1 in the "UNCL" column of the trace dependency structure 150. In the example, the trace T5-1 is unclean and control was transferred to the trace T1-2, which is also considered unclean. As will be explained, the trace scheduler 130 can ensure that traces that are unclean and that reference each other in the unclean column of the trace dependency structure 150 are executed using the same operand stack 410 within the trace executer 140.

In step 1154 the trace detector 110 identifies any subsequent traces of code (e.g., 147-A, 147-B, and so forth) to which execution control may be transferred after execution of the subsequent trace instruction as non-clean traces as well. In this manner, the trace dependency structure 150 can identify a group of related unclean traces.

At this point in processing, the trace detector 110 has identified entire set of traces 145 within segment of code 142 in a program 141 such as a Java application that he's been compiled into bite code. After all the traces 147 have been identified, the trace processor operates the dependency detector 120 to identify the dependency order between individual traces 147 within the set of identified traces 145.

Returning attention to the flow chart of processing steps FIG. 11 and specifically to step 1103, in step 1103 the trace processor 100 operates the dependency detector 120 to identify a dependency order (e.g., within the trace dependency structure 150) between traces 147 in the identified set of traces 145. The dependency order indicates traces that are dependent upon operation of other traces in the segment of code 142 (or the entire program 141 in this example). Generally, the processing to identify dependency order between traces 147 in the set of traces 145 is shown in FIG. 10 by sub-steps 1104 through 1106.

In step 1104, the dependency detector 120 inches a processing loop that occurs for each current trace 147 existing within the set of identified traces 145.

Within the processing loop defined by step 1104, in step 1105 the dependency detector 120 compares variable accessing instructions within the current trace 147 (i.e., bite code instructions in the current trace) to variable accessing instructions within other traces 147 in the set of traces 145 to identify potential trace dependencies in which the current trace contains variable accessing instructions (e.g., a bite code instructions) that are dependent upon the operation of other variable accessing instructions (i.e., other bite code instructions) in the at least one of the other traces 147 in the set of traces 145.

In one embodiment of the invention the potential trace dependencies include either a read-after-write variable dependency, a write-after-read variable dependency, and/or a write-after-write variable dependency between a variable accessing instruction in the current trace and at least one other variable accessing instruction in the at least one other trace in the set of traces 145 (with respect to other traces, as will be explained). That is, the dependency detector 120 can detect variables that have these types of dependency relationships.

In one embodiment of the invention, when comparing variable accessing instructions within the current trace to variable accessing instructions within other traces in the set of traces, the dependency detector 120 only compares variable accessing instructions within the current trace to variable accessing instructions within other traces having a trace number that is lower that the current trace number, such that the current trace is only compared for dependency order to other traces that are elder traces to the current trace. In other words, in the processing operation defined in the processing loop of step 1104 to compare variable accessing instructions in one trace to variable accessing instructions in another trace to detect the dependencies between these traces, only traces having a lower trace number and that could possibly execute prior to the current trace are compared for variable dependencies with the current trace.

In step 1106 the dependency detector 120 determines if the current trace contains a variable accessing instruction that is dependent upon the operation of another variable accessing instruction in another trace and if so, indicates the trace dependency in the trace dependency structure 150 that identifies the current trace as being dependent upon the other trace. As illustrated in FIG. 1, the trace dependency structure 150 can be a table, list or other such structure that contains a list of traces along with beginning in ending program counters of those traces. The dependency column labeled "DPNDS" indicates identities of other traces upon which the trace identified by this row in the trace dependency structure 150 depends. As an example, considering the five example traces T1-1 through T5-1 of the segment of code 142-1 shown in FIG. 1, trace T2-1 is dependent upon trace T1-1 and trace T4-1 is dependent upon trace T3-1 for execution. This means that of the five traces identified within the segment of code 142-1, traces T1-1, T3-1 and T5-1 could each be executed in parallel within the trace processor 100 since none of these three traces is dependent upon any other trace for execution. However, since trace T2-1 is dependent upon trace T1-1 for execution, trace T2-1 must at least wait until trace T1-1 has completed execution before the trace scheduler 130 can schedule trace T2-1 for execution. Note that while trace T5-1 is not dependent upon another trace for execution, this trace is marked as an unclean trace with respect to another trace T1-2, and thus when the trace scheduler 130 executes trace T5-1 any particular execution unit 195 containing a respective operand stack 410, the trace scheduler 130 will also have to execute trace T1-2 on this same stack without first executing any other trace before or after trace T5-1. Stated generally, when the trace is marked as "unclean," the trace detector 110 will have marked subsequent execution points to which transfer of control is sent from the ending of the unclean trace as beginning trace instructions that are also unclean traces. When a trace is "unclean" the trace detector 110 can mark (e.g., within the trace dependency structure 150 or another structure such as a basic block trace table) that trace as well as the other unclean traces (i.e., traces to which control could be transferred to the first unclean trace) as a related group of traces such that when the trace scheduler 130 executes one unclean trace, at the ending trace instruction in this trace at the point of transfer of control to the beginning instruction of the next trace (i.e., that is also unclean since the stack is not empty), that next trace will also be marked as unclean. This is because the simulated execution takes place using a single stack and since the former trace ended prior to a stack clean point, the stack will have information related to execution of instructions in the former trace at the beginning or first instruction of the next trace. Accordingly, during execution the trace scheduler 130 can instruct the trace executor 140 to not clear the execution structure stack 197 for the first unclean trace when he completes such so that it can subsequently schedule and execute the next or second unclean trace that can continue execution using this execution stack structure 197 in the same execution unit 195 as the prior unclean trace which preceded it and is now complete. In this manner, since two unclean traces execute one after another on the same operand stack 410 that has not been cleared of any values, any data dependencies and stack dependencies between these traces will be preserved by embodiments of the invention.

Upon completion of step 1106, the dependency detector 120 has detected all dependencies and the set of traces 145 in processing can proceed to step 1107 in FIG. 11.

Returning attention to FIG. 11, in step 1107 the trace processor 100 operates the trace scheduler 130 in conjunction with the trace executer 140 to schedule and execute traces 147 within the set of traces 145 in parallel with each other an execution order that is based upon the identified dependency order 150, such that at least two traces 147 (e.g., T1-1 and T1-3 in FIG. 1) are executed in parallel (e.g., within respective execution unit 195 in the trace executer 140) and such that if the dependency order 150 indicates that a second trace 147-1 (e.g., T1-2) is dependent upon a first trace 147-2 (e.g., T1-1), the first trace 147-2 (e.g., T1-1) is executed prior to the second trace 147-1 (e.g., T1-2). Accordingly, by executing the traces in parallel according to the dependencies 150, embodiments of the invention can significantly enhance execution speed of a program such as a job application.

Figure 15:
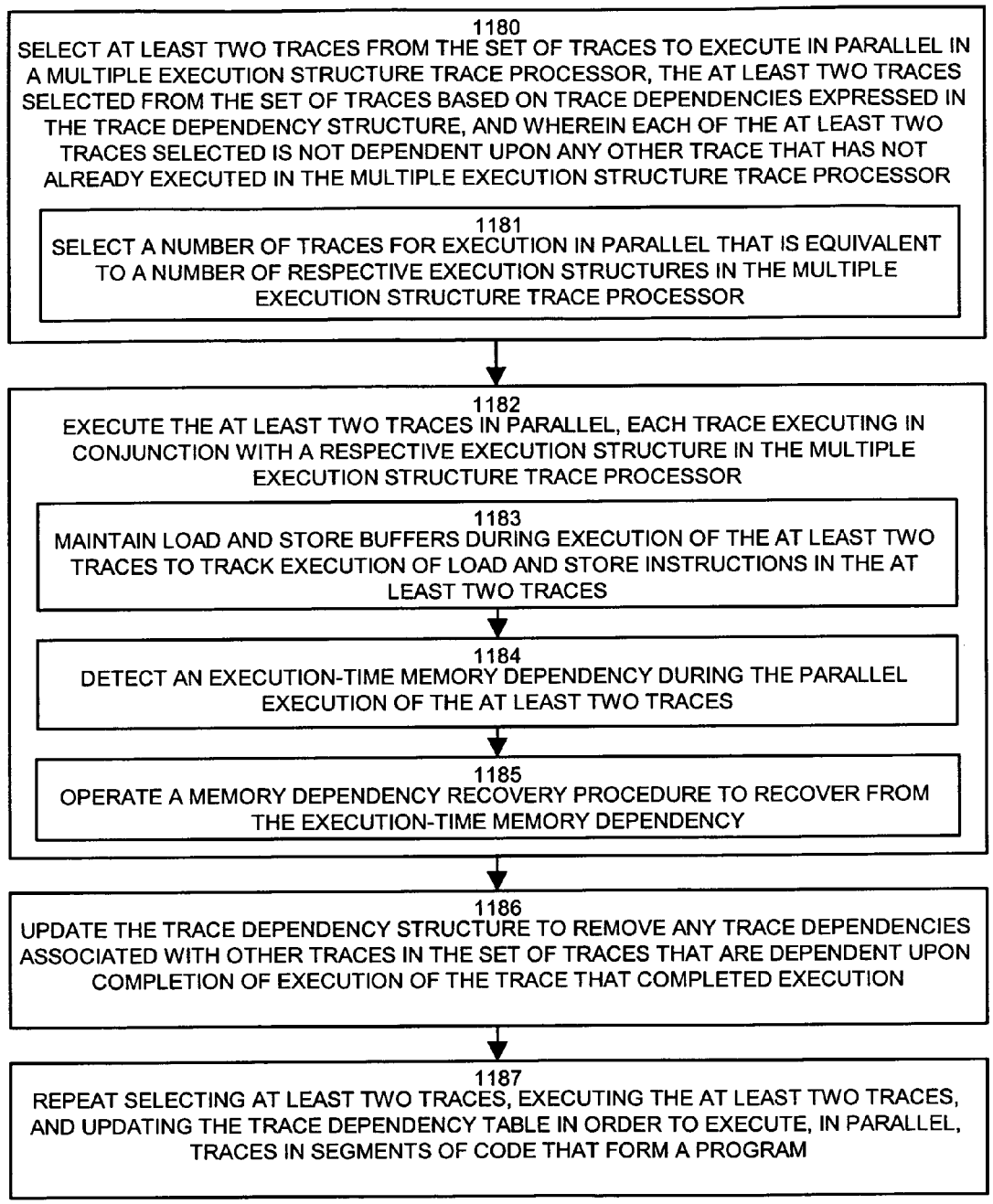
FIG. 15 is a flowchart of processing steps to execute traces in parallel according to an execution order based upon identified dependencies between traces in accordance with one example embodiment of the invention.

FIG. 15 is a flowchart of processing steps that illustrates details of processing performed by a trace scheduler 130 and a trace executer 140 operating within the trace processor 100 in accordance with one example embodiment of the invention in order to schedule and execute traces 147 in parallel based upon the dependency order specified in the trace dependency structure 150.

In step 1180 the trace scheduler 130 selects at least two traces (e.g., T1-1 and T3-1 in FIG. 1) from the set of traces 145 to execute in parallel in a multiple execution structure trace processor (e.g., within respective functional units 195-1 and 195-2, each containing a respective execution structure such as a stack 197-1 and 197-2). The traces selected from the set of traces 145 for execution are based on trace dependencies expressed in the trace dependency structure 150. In addition, the selected traces are not dependent upon any other trace that has not already executed in the trace processor 100.

In sub-step 1181, the trace scheduler 130 selects a number of traces for execution in parallel that is equivalent to a number of respective execution structures 197-1 . . . 197-X (and corresponding functional units 195) in the multiple execution structure trace processor 100 (i.e., within respective functional units 195).

In step 1182 the trace schedule or 130 causes the trace executer 140 to load and execute the selected traces 147 in parallel, with each trace executing in conjunction with a respective operand stack 410 in the multiple execution structure trace processor 100.

In step 1183 the trace executer 140 maintains load and store buffers during execution of the traces to track execution of load and store instructions in executing traces in the event of the memory dependency occurring during execution.

In step 1184 the trace executer 140 to detects an execution-time memory dependency during the parallel execution of the traces.

In step 1185, in response, the trace executer 140 operates a memory dependency recovery procedure to recover from the execution-time memory dependency.

In step 1186 the trace scheduler 130 updates the trace dependency structure 150 to remove any trace dependencies associated with other traces in the set of traces that are dependent upon completion of execution of the trace that completed execution. In this manner, if a trace in the trace dependency structure 150 is dependent upon another trace, when the other trace complete execution, the dependency can be removed such that the trace scheduler 130 can recognize that the other trace it was formerly dependent upon the now executed trace is now available for scheduling execution since the dependency is no longer present.

In step 1187 the trace scheduler 130 and trace executer 140 repeats the processing of step 1180 through 1182 in order to execute traces in parallel while updating the trace dependency structure 150 with execution state information 185 about traces that have completed execution. In other words, as the execution scheduler 130 selects traces 147 for execution based on the trace dependency structure 150, when the trace executer 140 completes execution of two or more concurrently executing traces in respective functional units 195 having respective execution structures, such as a stacks 197, upon completion of execution of each trace, the trace executer 150 can provide execution state information 185 back to the trace scheduler 130 which can update dependency information within the trace dependency structure 150.

In this manner, embodiments of the invention accomplish parallel execution of traces within a trace processor 100 in order to significantly decreased execution time of an application such as a Java program. It is to be understood that the example illustrated in FIG. 1 only shows three functional units 195, each of which represents the resources required to execute a particular traces and includes an operand stack 410 such as a stack. If additional functional units 195 are included within the trace executer 140, more than three traces 147 can be executed in parallel as well. Also, an architecture providing two functional units 195 would allow execution of two parallel traces at the same time.

Those skilled in the art will understand that there can be many variations made to the embodiments explained above while still achieving the same objective of those embodiments and the invention in general. The scope of this invention is intended to cover such variations. As such, the foregoing description of embodiments of the invention is not intended to be limiting.

What is claimed is:

1. A trace processor configured to support parallel execution of multiple instructions, the trace processor comprising:
    a trace detector that identifies traces in a segment of code including successive instructions, each of multiple identified traces in the segment of code including a set of instructions capable of being executed on an execution unit;
    a dependency detector that, prior to parallel execution of multiple identified traces on corresponding execution units, analyzes the traces identified in the segment of code to determine a dependency order for executing the traces, the dependency order identifying at least one of the traces associated with the segment of code that cannot be property executed in parallel with another trace in the segment of code;
    a trace scheduler coupled to the dependency detector and the trace detector, the trace scheduler receiving a set of traces and, based on the dependency order, causing the corresponding execution units to execute traces within the set of traces in parallel, the execution taking place in an execution order that is based on the identified dependency order, at least two traces being executed in parallel and if the dependency order indicates that a second trace is dependent upon a first trace, the first trace being executed prior to the second trace;
    multiple execution units to execute multiple traces in parallel based on the dependency order;
    a buffer to temporarily store results associated with execution of multiple executed traces;
    and
    a comparator circuit that, at run time of executing the multiple traces in parallel, identifies an out-of-order memory dependency condition associated with parallel executed traces resulting in an error; and
    the comparator circuit, in response to identifying the out-of-order memory dependency condition:
    squashes execution of latter traces in the segment of code that depend on results from earlier traces; and
    clears results in the temporary buffer associated with the squashed traces.

2. The trace processor as in claim 1, wherein the traces each include
    a sequence of contiguous instructions intended to be executed successively in time and the dependency order indicates which of the multiple traces must be executed before others identified in the segment of code.

3. The trace processor as in claim 2, wherein
    the scheduler schedules parallel execution of traces detected within a basic block of JAVA code on multiple execution units according to the dependency order.

4. The trace processor as in claim 1, wherein the trace detector identifying traces in the segment of code includes identifying operand stack dependencies associated with portions of the segment of code and wherein the corresponding execution units each include an operand stack.

5. The trace processor as in claim 1, wherein the dependency detector analyzes the traces to determine data dependencies associated with traces in the segment of code and identifies the dependency order for executing at least some of the traces in parallel at run time.

6. The trace processor as in claim 1 wherein the comparator circuit, in response to identifying the out-of-order memory dependency condition, reschedules squashed traces for later execution.

7. The trace processor as in claim 1, wherein at least one of the traces is processed to include a folded bytecode instruction replacing a corresponding sequence of bytecode instructions.

8. The trace processor as in claim 1 further comprising:
a fetcher that fetches multiple code instructions from different traces identified in the segment of code;
a decoder that decodes the multiple fetched code instructions into corresponding bytecode instructions; and
a buffer unit to store the bytecode instructions associated with the multiple decoded code instructions in corresponding trace buffers for each trace.

9. The trace processor as in claim 1 wherein the comparator circuit identifies an out of order memory dependency condition based on a search for:
i) a READ after a WRITE to the same memory address for different parallel executed traces,
ii) a WRITE after a READ to the same memory address for different parallel executed traces, and
iii) a WRITE after a WRITE to the same memory address for different parallel executed traces.

10. The trace processor as in claim 1, wherein the dependency detector analyzing the traces in the segment of code determines a dependency order by comparing memory access instructions in a first trace to memory access instructions in other traces identified in the segment of code to identify a potential trace dependency in which the first trace contains a memory access instruction that depends on the operation of another memory access instruction in at least one of the other traces identified in the segment of code.

11. The trace processor as in claim 1, wherein the trace detector identifying traces within the segment of code:
identifies a beginning trace instruction in the segment of code whose operation corresponds to a first clean condition of an execution unit;
identifies a subsequent trace instruction in the segment of code whose operation corresponds to a non-clean condition of the execution unit; and
identifies an ending trace instruction in the segment of code whose operation follows the first clean condition and the non-clean condition of the execution unit and that corresponds to at least one of:
i) a second clean condition of the execution unit; and
ii) an end of the segment of code; and
designates, as a trace within the segment of code, all instructions in the segment of code including, and in-between, the beginning trace instruction and the ending trace instruction.

12. The trace processor as in claim 1, wherein the dependency detector identifying the dependency order, upon completion of execution of at least two traces, updates the dependency order to remove any trace dependencies associated with other non-executed traces that depended on completion of execution of the at least two executed traces.

13. A method associated with parallel execution of multiple instructions, the method comprising:
identifying traces in a segment of code including successive instructions, each of multiple identified traces in the segment of code including a set of instructions capable of being executed on an execution unit;
prior to parallel execution of multiple identified traces on corresponding execution units, analyzing the traces identified in the segment of code to determine a dependency order for executing the traces, the dependency order identifying at least one of the traces associated with the segment of code that cannot be properly executed in parallel with another trace in the segment of code;
receiving a set of traces and, based on the dependency order, executing traces within the set of traces in parallel, the execution taking place in an execution order that is based on the identified dependency order, at least two traces being executed in parallel and if the dependency order indicates that a second trace is dependent upon a first trace, the first trace being executed prior to the second trace;
executing multiple traces in parallel based on the dependency order;
temporarily storing results associated with execution of the multiple traces in a temporary buffer; and
at run time, identifying an out-of-order memory dependency condition associated with parallel executed traces resulting in an error; and
in response to identifying the out-of-order memory dependency condition:
squashing execution of latter traces in the segment of code that depend on results from earlier traces and clearing results in the temporary buffer associated with the squashed traces.

14. A method as in claim 13, wherein the traces each include a sequence of contiguous instructions intended to be executed successfully in time and the dependency order indicates which of the multiple traces must be executed before others identified in the segment of code.

15. A method as in claim 14 further comprising: scheduling parallel execution of traces detected within a basic block of JAVA code on multiple execution units according to the dependency order.

16. A method as in claim 13, wherein identifying traces in the segment of code includes identifying operand stack dependencies associated with portions of the segment of code and wherein the corresponding execution units each including an operand stack.

17. A method as in claim 13, wherein analyzing the traces includes determining data dependencies associated with traces in the segment of code to identify the dependency order for executing at least some of the traces in parallel at run time.

18. A method as in claim 13 further comprising: rescheduling squashed traces for later execution.

19. A method as in claim 13, wherein at least one of the traces is processed to include a folded JAVA bytecode instruction replacing a corresponding sequence of JAVA bytecode instructions.

20. A method as in claim 13 further comprising:
fetching multiple code instructions from different traces identified in the segment of code;
decoding the multiple fetched code instructions into corresponding bytecode instructions; and
storing the bytecode instructions associated with the multiple decoded code instructions in corresponding trace buffers for each trace.

21. A method as in claim 13 wherein identifying an out of order memory dependency condition includes searching for:

i) a READ after a WRITE to the same memory address for different parallel executed traces, ii) a WRITE after a READ to the same memory address for different parallel executed traces, and iii) a WRITE after a WRITE to the same memory address for different parallel executed traces.

22. A method as in claim 13, wherein analyzing the traces in the segment of code to determine a dependency order includes:

comparing memory access instructions in a first trace to memory access instructions in other traces identified in the segment of code to identify a potential trace dependency in which the first trace contains a memory access instruction that depends on the operation of another memory access instruction in at least one of the other traces identified in the segment of code.

23. A method as in claim 13, wherein identifying traces within the segment of code comprises:

identifying a beginning trace instruction in the segment of code whose operation corresponds to a first clean condition of an execution unit;

identifying a subsequent trace instruction in the segment of code whose operation corresponds to a non-clean condition of the execution unit; and identifying an ending trace instruction in the segment of code whose operation follows the first clean condition and the non-clean condition of the execution unit and that corresponds to at least one of:

i) a second clean condition of the execution unit; and ii) an end of the segment of code; and designating, as a trace within the segment of code, all instructions in the segment of code including, and in-between, the beginning trace instruction and the ending trace instruction.

24. A method as in claim 13, wherein identifying the dependency order further comprises:

upon completion of execution of at least two traces, updating the dependency order to remove any trace dependencies associated with other non-executed traces that depended on completion of execution of the at least two executed traces.

25. A computer program product including a computer-readable medium having instructions stored thereon for processing data information, such that the instructions, when carried out by a processing device, enable the processing device to perform the steps of:

identifying traces in a segment of code including successive instructions, each of multiple identified traces in the segment of code including a set of instructions capable of being executed on an execution unit;

prior to parallel execution of multiple identified traces on corresponding execution units, analyzing the traces identified in the segment of code to determine a dependency order for executing the traces, the dependency order identifying at least one of the traces associated with the segment of code that cannot be properly executed in parallel with another trace in the segment of code;

receiving a set of traces and, based on the dependency order, executing traces within the set of traces in parallel, the execution taking place in an execution order that is based on the identified dependency order, at least two traces being executed in parallel and if the dependency order indicates that a second trace is dependent upon a first trace, the first trace being executed prior to the second trace;

executing multiple traces in parallel based on the dependency order;

temporarily storing results associated with execution of the multiple traces in a temporary buffer; and at run time, identifying an out-of-order memory dependency condition associated with parallel executed traces resulting in an error; and in response to identifying the out-of-order memory dependency condition:

squashing execution of latter traces in the segment of code that depend on results from earlier traces and clearing results in the temporary buffer associated with the squashed traces.

26. A trace processor configured to support parallel execution of multiple instructions, the trace processor comprising:

means for identifying traces in a segment of code including successive instructions, each of multiple identified traces in the segment of code including a set of instructions capable of being executed on at least one execution unit;

means for analyzing the multiple identified traces identified in the segment of code, prior to parallel execution of the multiple identified traces on corresponding execution units, to determine a dependency order for executing the multiple identified traces, the dependency order identifying at least one of the traces associated with the segment of code that cannot be properly executed in parallel with another trace in the segment of code;

means for receiving a set of traces and, based on the dependency order, executing traces within the set of traces in parallel, the execution taking place in an execution order that is based on the identified dependency order, at least two traces being executed in parallel and if the dependency order indicates that a second trace is dependent upon a first trace, the first trace being executed prior to the second trace;

a temporarily buffer coupled to the execution units to store results associated with execution of multiple traces of the segment of codes;

a comparator circuit to detect whether an out-of-order memory dependency condition associated with parallel executed traces occurs at run-time of executing the multiple traces in parallel, the comparator circuit conditionally loading the results stored in the temporary buffer to memory after particular trace completes execution; and squashing execution of latter traces in the segment of code that depend on results from earlier traces; and clears results in the temporary buffer associated with the squashed traces.

27. A trace processor configured to support parallel execution of multiple instructions, the trace processor comprising:

a fetcher to fetch instructions;

a trace detector coupled to receive the fetched instructions, the trace detector identifying traces in a segment of code including successive instructions, each of multiple identified traces in the segment of code including a set of instructions capable of being executed on an execution unit;

a dependency detector that, prior to parallel execution of multiple identified traces on corresponding execution units, analyzes the traces identified in the segment of code to determine a dependency order for executing the traces, the dependency order identifying at least one of the traces associated with the segment of code that cannot be properly executed in parallel with another trace in the segment of code;

a trace scheduler coupled to the dependency detector and the trace detector, the trace scheduler receiving a set of traces and, based on the dependency order, causing the corresponding execution units to execute traces within the set of traces in parallel, the execution taking place in an execution order that is based on the identified dependency order, at least two traces being executed in parallel and if the dependency order indicates that a second trace is dependent upon a first trace, the first trace being executed prior to the second trace; and multiple execution units to execute the traces in parallel;

a temporary buffer coupled to the execution units to store results associated with execution of multiple traces of the segment of code;

a comparator circuit to detect whether an out-of-order memory dependency condition associated with parallel executed traces occurs at run-time of executing the multiple traces in parallel, the comparator circuit conditionally loading the results stored in the temporary buffer to memory after the particular trace completes execution; and a squash circuit coupled to receive a signal from the comparator circuit identifying detection of an out-of-order memory dependency condition, the squash circuit:

squashing execution of latter traces in the segment of code that depend on results from earlier traces; and clearing results in the temporary buffer associated with the squashed traces.

28. The trace processor as in claim 27 wherein the squash circuit generates a signal to the trace scheduler to reschedule squashed traces for later execution.

29. The trace processor as in claim 27 further comprising:
a basic block trace table cache to store trace information associated with a currently executed method.

30. The trace processor as in claim 29 further comprising:
bytecode trace fetch logic that utilizes multiple program counters stored in the basic block trace table cache to order the fetcher to fetch multiple instructions from multiple locations of a method cache.

31. The trace processor as in claim 29 further comprising:
a decoded bytecode trace buffer including individual buffers, each individual buffer storing instructions for a given trace.

32. The trace processor as in claim 31, wherein the trace scheduler:

identifies non-dependent traces based on the trace information in the basic block trace table cache;

selects the set of traces to be executed on corresponding execution units;

allocates execution units to execute the set of traces in parallel; and fetches the set of traces from the decoded bytecode trace buffer for parallel execution by the execution units.

33. The trace processor as in claim 27, wherein each execution unit includes an operand stack, a reservation station and an associated functional unit.

34. The trace processor as in claim 27, wherein each execution unit includes multiple sets of shared local variable registers, and a set of local variable registers being utilized by a corresponding method.

35. The trace processor as in claim 27, wherein each execution unit includes:

a load buffer and a store buffer to temporarily store retrieved and modified data associated with multiple parallel executed traces in a scratchpad area.

* * * * *

UNITED STATES PATENT AND TRADEMARK OFFICE
CERTIFICATE OF CORRECTION

PATENT NO.        : 7,600,221 B1                                   Page 1 of 1
APPLICATION NO.   : 10/679939
DATED             : October 6, 2009
INVENTOR(S)       : Achutha Raman Rangachari It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1454 days.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

Page 1 of 1

PATENT NO.         : 7,600,221 B1
APPLICATION NO.    : 10/679939
DATED              : October 6, 2009
INVENTOR(S)        : Achutha Raman Rangachari It is certified that error appears in the above-identified patent and that said Letters Patent is hereby corrected as shown below:

Col. 36 line 46
After "trace completes execution; and"

Insert:

-- a squash circuit coupled to receive a signal from the comparator circuit
identifying detection of an out-of-order memory dependency condition,
the squash circuit: --

Signed and Sealed this
Eighteenth Day of January, 2011

David J. Kappos
*Director of the United States Patent and Trademark Office*